US012695144B2

(12) United States Patent
Cecconi et al.

(10) Patent No.: US 12,695,144 B2
(45) Date of Patent: Jul. 28, 2026

(54) SUPPLY DEVICE AND MODULAR SUPPLY SYSTEM SO OBTAINED

(71) Applicant: HYBA LTD., London (GB)

(72) Inventors: Jacopo Cecconi, Bologna (IT);
Edoardo Gnesi, Asciano (IT);
Costanza Hermanin De Reichenfeld,
Florence (IT); Paolo Acciai, Florence
(IT); Roberto Cicalo', San Teodoro
(IT); Daniele Calderoni Parronchi,
Florence (IT)

(73) Assignee: HYBA LTD., London (GB)

( * ) Notice: Subject to any disclaimer, the term of this
patent is extended or adjusted under 35
U.S.C. 154(b) by 623 days.

(21) Appl. No.: 18/028,538

(22) PCT Filed: Sep. 24, 2021

(86) PCT No.: PCT/IB2021/058722
§ 371 (c)(1),
(2) Date: Mar. 25, 2023

(87) PCT Pub. No.: WO2022/064438
PCT Pub. Date: Mar. 31, 2022

(65) Prior Publication Data
US 2023/0356606 A1 Nov. 9, 2023

(30) Foreign Application Priority Data
Sep. 25, 2020 (IT) ........................ 102020000022719

(51) Int. Cl.
*H01M 50/213* (2021.01)
*B60L 50/64* (2019.01)
(Continued)

(52) U.S. Cl.
CPC ........... *H01M 50/213* (2021.01); *B60L 50/64*
(2019.02); *H01M 10/4257* (2013.01);
(Continued)

(58) Field of Classification Search
CPC ............. H01M 50/213; H01M 50/244; H01M
50/256; H01M 50/262; H01M 50/271;
(Continued)

(56) References Cited

U.S. PATENT DOCUMENTS

2016/0093843 A1 3/2016 Reineccius et al.
2019/0160972 A1* 5/2019 Zeiler ................. H01M 10/441

FOREIGN PATENT DOCUMENTS

EP 3 639 113 A1 4/2020
JP 5372562 B2 12/2013
(Continued)

*Primary Examiner* — Eugenia Wang
(74) *Attorney, Agent, or Firm* — Jason L DeFrancesco

(57) ABSTRACT

A supply device comprising a tubular body configured to
contain a battery pack formed by a plurality of cells orga-
nized in a predetermined number of layers. The supply
device provides, furthermore, a control unit configured to
monitor the state of functioning and to manage the state of
charge of the battery pack and a connector comprising a
plurality of electrical contacts to supply, or absorb, a pre-
determined electric power. The supply device provides,
furthermore, connection cables for connecting the battery
pack to the aforementioned plurality of electrical contacts of
the connector to the control unit. The layer of cells com-
prises a first group of cells and at least a second group of
cells between which a housing channel is defined configured
to house, in use, the connection cables.

15 Claims, 25 Drawing Sheets

(51) Int. Cl.

| | | |
|---|---|---|
| *H01M 10/42* | (2006.01) | |
| *H01M 50/244* | (2021.01) | |
| *H01M 50/249* | (2021.01) | |
| *H01M 50/256* | (2021.01) | |
| *H01M 50/262* | (2021.01) | |
| *H01M 50/271* | (2021.01) | |
| *H01M 50/284* | (2021.01) | |
| *H01M 50/291* | (2021.01) | |
| *H01M 50/296* | (2021.01) | |
| *H01M 50/298* | (2021.01) | |

(52) U.S. Cl.
CPC ....... *H01M 50/244* (2021.01); *H01M 50/249* (2021.01); *H01M 50/256* (2021.01); *H01M 50/262* (2021.01); *H01M 50/271* (2021.01); *H01M 50/284* (2021.01); *H01M 50/291* (2021.01); *H01M 50/296* (2021.01); *H01M 50/298* (2021.01); *H01M 2220/20* (2013.01)

(58) Field of Classification Search
CPC ............. H01M 50/284; H01M 50/291; H01M 50/296; H01M 50/298; H01M 50/249; H01M 10/4257; H01M 10/482; H01M 10/441; H01M 10/486; H01M 2010/4271; H01M 2220/20; B60L 50/64
See application file for complete search history.

(56) References Cited

FOREIGN PATENT DOCUMENTS

| WO | 2016/049358 A1 | 3/2016 |
|---|---|---|
| WO | 2017/011475 A1 | 1/2017 |
| WO | 2020/112618 A1 | 6/2020 |

* cited by examiner

SUPPLY DEVICE AND MODULAR SUPPLY SYSTEM SO OBTAINED

FIELD OF THE INVENTION

The present invention relates to the field of electric, or hybrid, vehicles, and relates to a supply device formed by a battery pack to supply the aforementioned electric or hybrid vehicles.

The invention, furthermore, relates to a modular supply system formed by a determined number of the aforementioned supply devices.

DESCRIPTION OF THE PRIOR ART

As known, several typologies of battery packs exist, also called multi-cells batteries, that are used in particular to supply electrical devices of different type, and in particular electric, or hybrid vehicles, such as bicycles, motorcycles, and vehicles with 2, or more wheels in general.

In particular, in case of electric, or hybrid vehicles, these provide one, or more, battery packs rechargeable which supply the vehicle propulsion device. Normally, a battery pack is formed by a determined number of cells connected in series and/or in parallel in such a way to form altogether a cell with a high store capacity of electrical energy, or to reach high values of the supplied electric power.

The different cells forming the battery pack can be held together by a wrapper made of plastic.

The battery pack is normally associated to a control unit to control the state of functioning and the supply of electric power of the battery pack.

Supply devices also exist comprising an external case where the battery pack is housed. In this case, the lateral walls of the case hold the cells of the battery pack in position.

A drawback of the battery packs of prior art, is that the battery packs normally provide a lot of connection cables for connecting the cells to a series of electrical contacts and to the control unit.

Therefore, in the case of battery packs formed by a very great number of cells, the connection cables occupy a large volume. Therefore, also the supply device of which the battery pack is the main part, has large dimensions. This greatly limits the use of these supply devices, because it impedes their use where a large space is not available for them, or anyway to resort to design solutions which change the appearance of the electric device, in particular of the electric vehicle supplied by the supply device.

Another drawback of the supply devices of prior art is that both their removal and their introduction within the respective housings, as well as at the recharge stations, mainly owing to their shape. In fact, the supply devices of prior art are normally prismatic shaped with a substantially rectangular, or substantially square, section, which obstructs to easily and quickly introduce the supply device within the housing seat or to remove the same from the housing seat same.

Some examples of the aforementioned supply devices having the aforementioned drawbacks are described in WO2016/049358, WO2017/011475 and WO2020/112618.

SUMMARY OF THE INVENTION

It is, therefore, an object of the present invention to provide a supply device, in particular to supply a electric, or hybrid vehicle, that is able to overcome the aforementioned drawbacks of the supply devices of prior art comprising battery packs of cells.

It is, in particular, an object of the present invention to provide a supply device, in particular to supply an electric, or hybrid, vehicle that is easy to assembly and to disassemble and, at the same time, that is highly efficient.

It is also an object of the invention to provide a modular system, in particular to supply an electric vehicle, that is able to assure an easy and quick introduction and removal of a supply device within/from a housing channel.

It is another object of the invention to provide a system able to operate the electric vehicle supplied by the same also with less supply modules than those that can be installed providing a greater flexibility of use.

These and other objects are achieved by a supply device, according to the invention, in particular for an electric, or hybrid, vehicle, said supply device comprising:

- a tubular body configured to contain a battery pack formed by a plurality of cells organized in a predetermined number of layers;
- a control unit configured to monitor the state of functioning and to manage the state of charge of said battery pack;
- a connector comprising a plurality of electrical contacts to supply, or absorb, a predetermined electric power;
- a plurality of connection cables arranged to connect said battery pack to said plurality of electrical contacts of said connector and to said control unit;
- whose main characteristic is that said, or each, layer of cells comprises a first group of cells and at least a second group of cells, that between said first group of cells and said second group of cells a housing channel is formed configured to contain, in use, said plurality of connection cables and that said housing channel is defined between a first lateral containment wall and at least a second lateral containment wall in such a way that to separate the aforementioned plurality of cells from said housing channel.

Other features of the invention and the related embodiments are set out in the dependent claims.

In particular, the aforementioned tubular body can be provided with a lateral surface having a substantially prismatic shape and a first and a second end wall can be provided positioned at opposite sides with respect to the tubular body. More in particular, la aforementioned second end wall can be provided with the aforementioned connector.

Advantageously, the first end wall can be provided with a handle portion in particular arranged to move between a rest position, where it forms a perimeter edge of the first end wall, and a grasp position, where the handle portion is, preferably, inclined with respect to the first end wall, in such a way to allow a user to grasp the same.

In particular, a first, a second, and a third layer of cells superimposed to each other can be arranged within the supply device. More in particular, the cells of each layer of cells can be connected in series.

According to another aspect of the invention, a modular system, in particular to supply an electric, or hybrid, vehicle comprises:

- a battery housing comprising a plurality of housing seats having a substantially prismatic shape, each housing seat being provided with a respective connector comprising a plurality of electrical contacts;
- a plurality of supply devices provided with tubular bodies having a substantially prismatic shape and configured to contain at least a respective battery pack formed by a plurality of cells organized in a predetermined number of layers of cells, each supply device of said plurality being arranged to move from a position external to said main body, to a internal position, where is arranged to engage in a housing seat of said battery housing, each supply device of said plurality being provided with a second connector comprising a plurality of electrical contacts arranged to be connected to said first connector to supply a predetermined electric power when at least a supply device is positioned in the aforementioned internal position, each supply device being provided with a respective control unit configured to monitor the state of functioning and to manage the state of charge of said battery pack;

a central control unit operatively connected to the aforementioned control unit of said plurality of supply devices and to said vehicle;

whose main characteristic is that said, or each, layer of cells comprises at least a first group of cells and a second group of cells, that between said first group and said second group a housing channel is defined configured to house, in use, a plurality of connection cables arranged to connect said battery pack to said first connector and, therefore, to said second connector when said supply device is positioned in said internal position and that said housing channel is defined between a first lateral containment wall and at least a second lateral containment wall in such a way that to separate the aforementioned plurality of cells from said housing channel.

Advantageously, the aforementioned battery housing can be provided with 2, or more housing seats.

According to a further aspect of the invention, a modular supply system, in particular to supply an electric, or hybrid, vehicle comprises:

a battery housing comprising a plurality of housing seats having a substantially prismatic shape, each housing seat being provided with a respective first connector comprising a plurality of electrical contacts;

a plurality of supply devices provided with tubular bodies having a substantially prismatic shape and configured to contain a respective battery pack formed by a plurality of cells organized in a predetermined number of layers of cells, each supply device of said plurality being arranged to move from a position external a said main body, ad a internal position, where is arranged to engage in a respective housing seat of said battery housing, each supply device of said plurality being provided with a respective second connector arranged to be connected to said first connector to supply a predetermined electric power when is arranged in said internal position, each supply device being provided with a respective control unit configured to monitor the state of functioning and to manage the state of charge of said battery pack;

a central control unit operatively connected to said control unit of said plurality of supply devices and a said vehicle;

whose main characteristic is that the aforementioned supply devices and the aforementioned housing seats are configured to carry out a shape coupling and that the supply devices and the housing seats are provided with respective lateral surfaces comprising respectively at least a first and a second converging side, in such a way to help each supply device to move from the position external to the internal position and vice versa.

According to still another aspect of the invention, a modular supply system, in particular to supply an electric or hybrid vehicle, comprises:

a battery housing comprising a plurality of housing seats having a substantially prismatic shape, each housing seat being provided with a respective first connector comprising a plurality of electrical contacts;

a plurality of supply devices provided with tubular bodies having a substantially prismatic shape and configured to contain a respective battery pack formed by a plurality of cells organized in a predetermined number of layers of cells, each supply device of said plurality being arranged to move from a position external to said main body, to an internal position, where is arranged to engage in a respective housing seat of said battery housing, each supply device of said plurality being provided with a respective second connector comprising a plurality of electrical contacts and arranged to be connected to said first connector to supply a predetermined electric power when is arranged in the internal position, each supply device being provided with a respective control unit configured to monitor the state of functioning and to manage the state of charge of said battery pack;

a central control unit operatively connected to said control unit of said plurality of supply devices, in particular to monitor the state of functioning and to manage the state of charge of the different supply devices;

whose main characteristic is that each supply device is provided with a handle portion configured to move between a rest position, where it forms a perimeter edge of a first end wall of said supply device, and a grasp position, where la handle portion is inclined with respect to the first end wall and to allow the user to grasp the same.

In particular, each supply device of the aforementioned plurality can be associated to a respective measurement device configured to measure the level of charge, or "SOC" and to send the respective measured level of charge to said central control unit. More in particular, the central control unit can be arranged to elaborate the aforementioned measured levels of charge and to divide the aforementioned plurality of supply devices into a plurality of supply groups each of which comprising a predetermined number of supply devices. More precisely, the supply devices of each supply group have a value equal to the level of charge, or anyway levels of charge which differ from one another within a predetermined range of tolerance, for example within 10%, advantageously within 5% of their values.

According to still another aspect of the invention, a supply device, in particular for an electric, or hybrid, vehicle, comprises:

a tubular body configured to contain a battery pack formed by a plurality of cells organized in a plurality of layers of cells superimposed to each other;

a control unit configured to monitor the state of functioning and to manage the state of charge of said battery pack;

a connector comprising a plurality of electrical contacts to supply, or absorb, a predetermined electric power;

a plurality of connection cables arranged to connect said battery pack to said plurality of electrical contacts of said connector and to said control unit;

whose main characteristic is that between two consecutive layers of cells an interposition member is positioned comprising an electrical connection member made of an electrical conductive material, in particular a metallic material, provided with a first and of a second plurality of contacting portions positioned at respective sides of said electrical connection member, that said contacting portions of each of the aforementioned first and second plurality are positioned in respective axial symmetric positions with respect to an axis of symmetry, and that each contacting portion of the first and the second plurality is positioned adjacent, in use, to a respective cell, in particular to the pole of this.

In particular, the electrical connection member can comprise a first plate portion and a second plate portion arranged, in use, on substantially parallel planes and provided respectively with the first and the second plurality of contacting portions. More in particular, each contacting portion of the first plurality of contacting portions can be superimposed to a respective contacting portion of the second plurality of contacting portions.

Preferably, la first and la second plate portion are mutually engaged to each other by a connection portion configured in such a way that the first and the second plate portion are able to elastically approach, or depart from, one with respect to the other. In particular, the connection member 95 can be a plate having a thickness comprised between 0.1 mm and 0.6 mm, advantageously comprised between 0.2 mm and 0.4 mm, for example produced by metallic material forming and, then, bent to form a "U".

Advantageously, between the first plate portion and the second plate portion at the superimposed contacting portions at least an elastic member can be provided, preferably made of an elastomeric material, for example EPDM (Ethylene-Propylene Diene Monomer), or silicone.

In particular, the first and the second plate portion are mutually engaged to each other by welding at least at a welded portion, advantageously arranged along the axis of symmetry. Therefore, the electrical connection member is arranged to allow the electric current to move between the first plate portion and the second plate portion only at the, or each, welded portion.

BRIEF DESCRIPTION OF THE DRAWINGS

The invention will now be shown with the following description of its exemplary embodiments, exemplifying but not limitative, with reference to the attached drawings in which.

Figure 1:
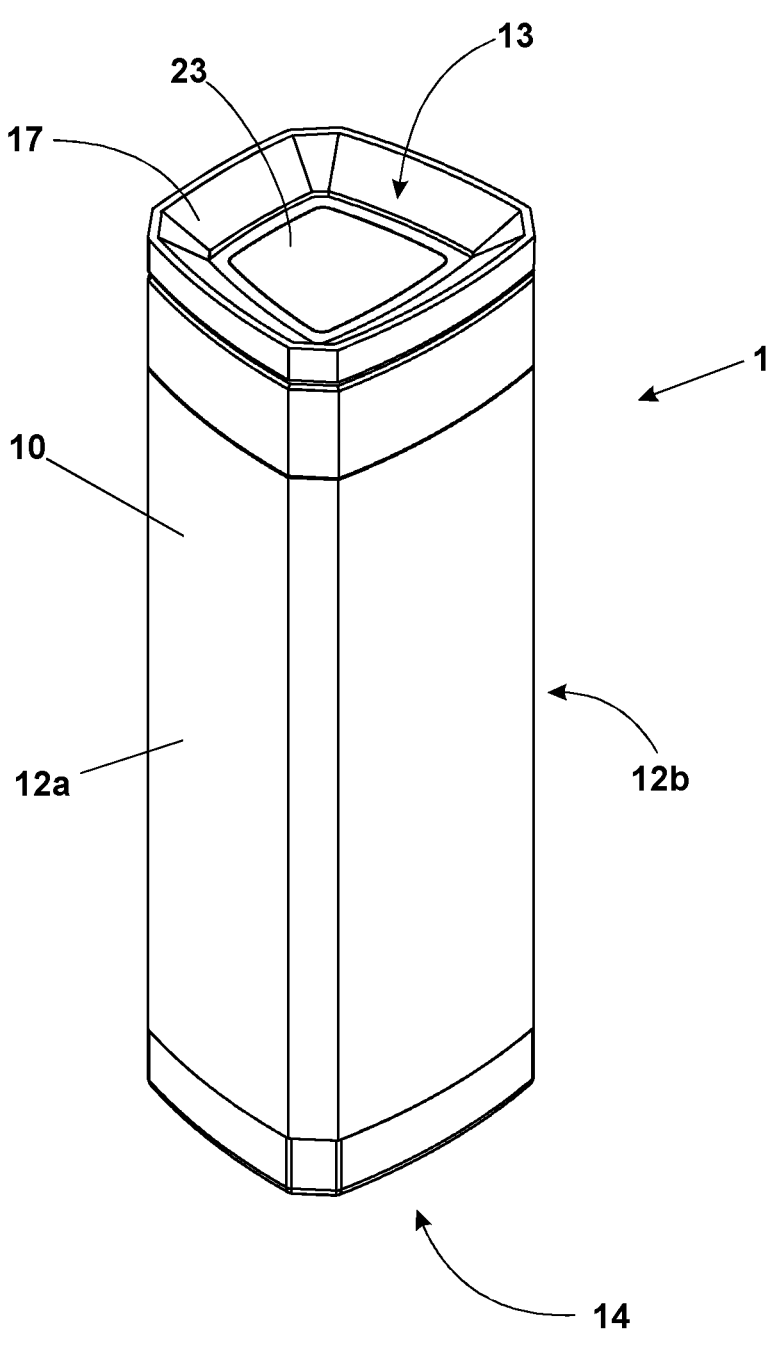
FIG. 1 diagrammatically shows a perspective side elevation view of a first embodiment of a supply device according to the invention.
Figures 7A, 7B:
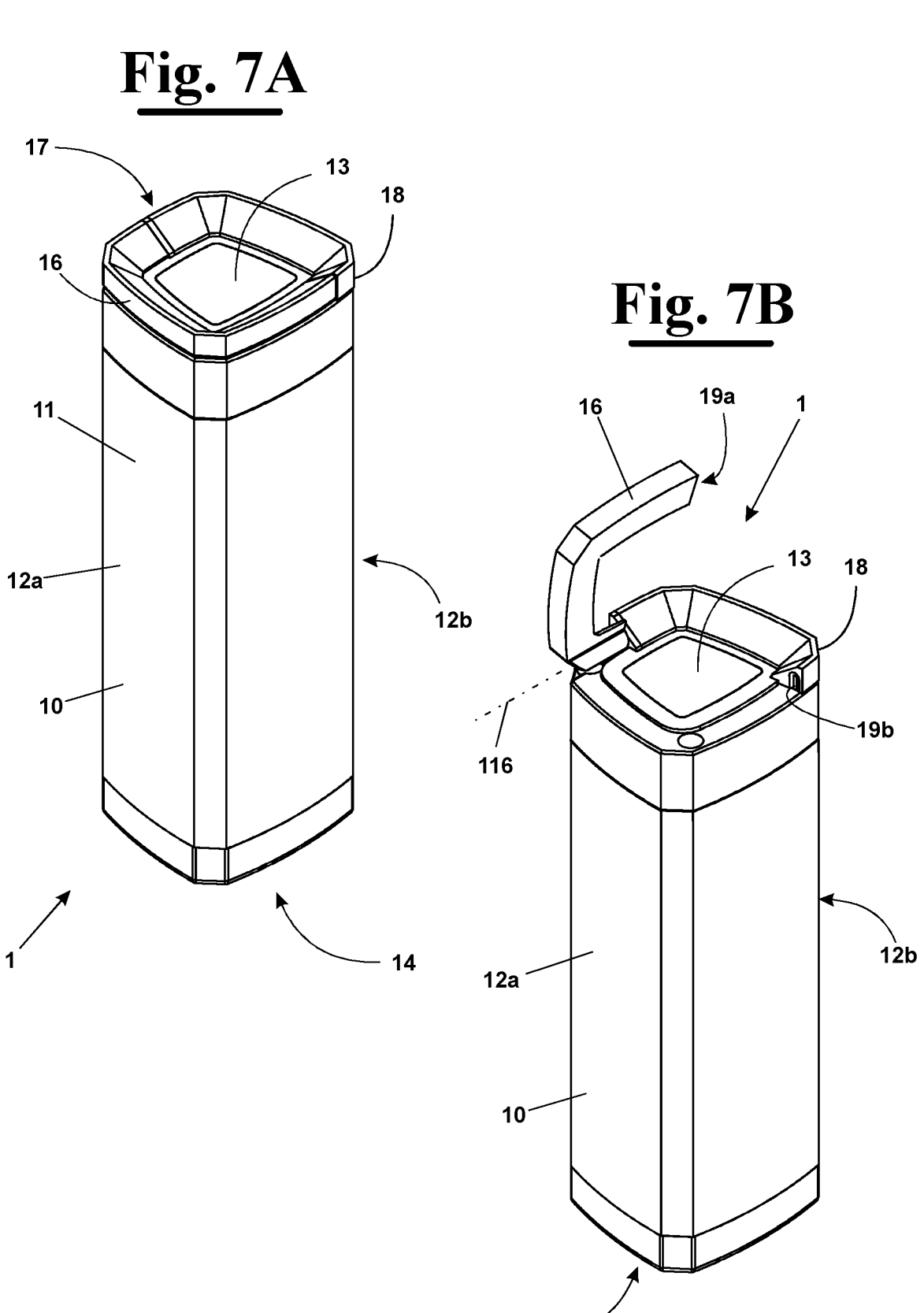
Figure 8:
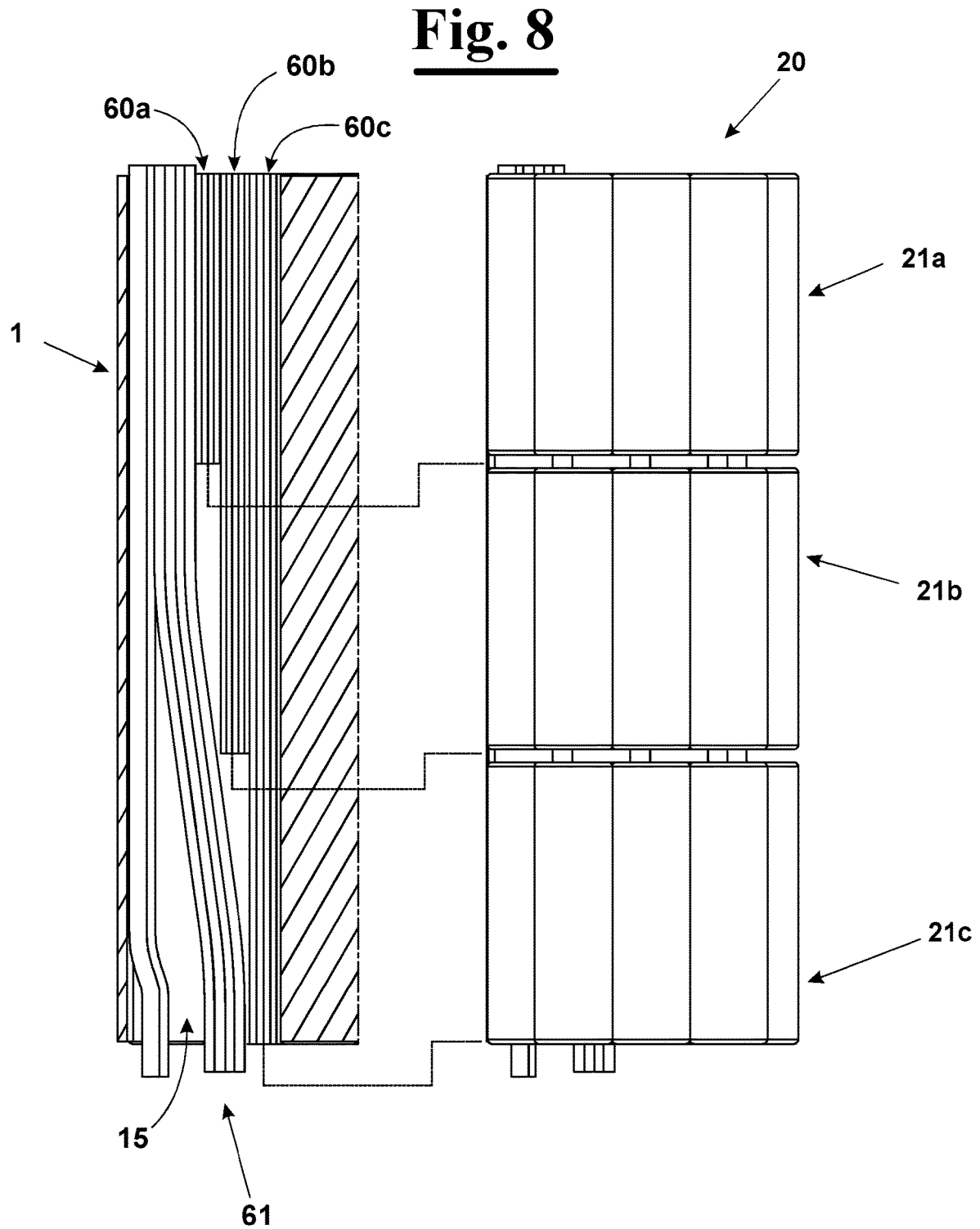
Figures 9A, 9B:
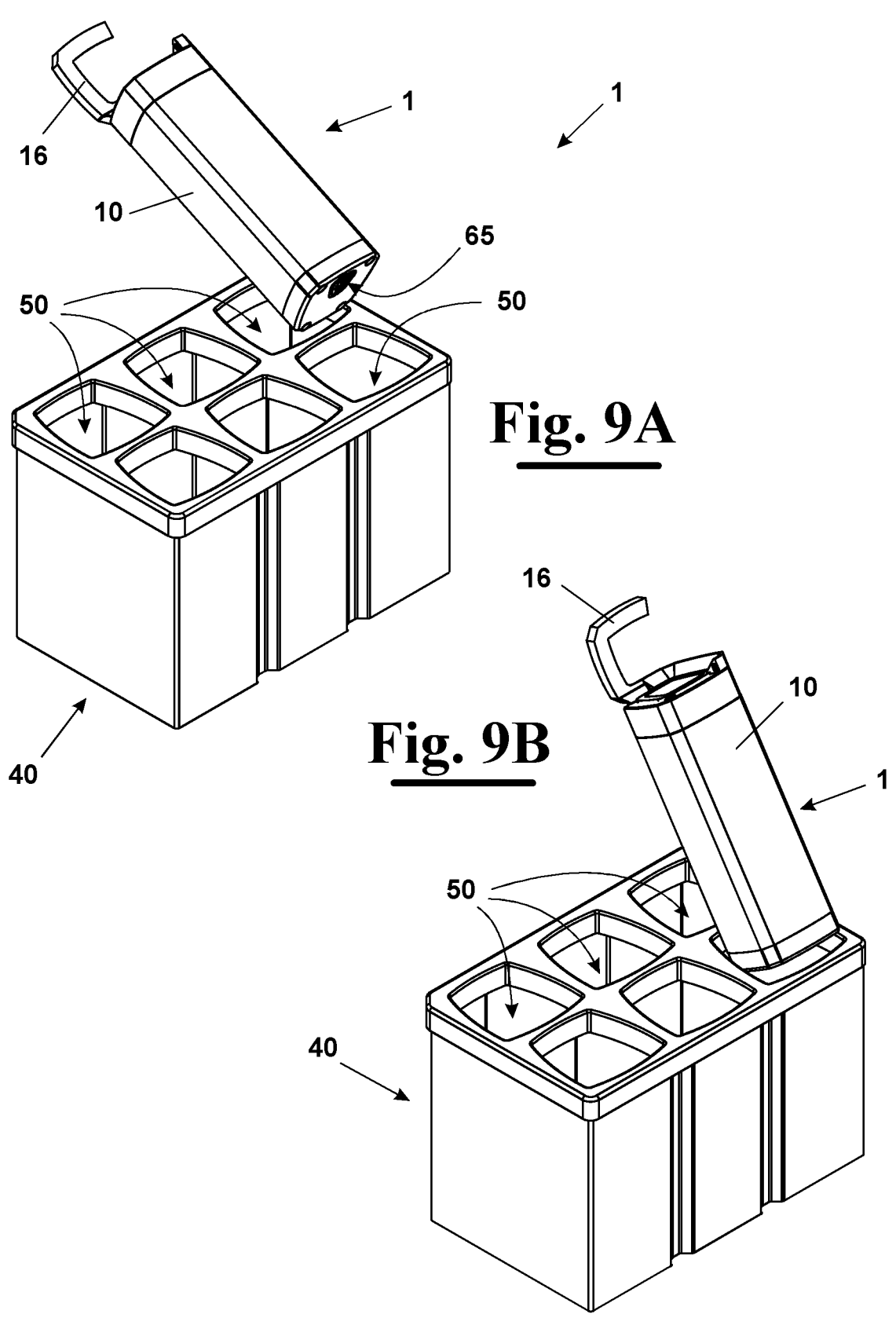
Figures 9C, 9D:
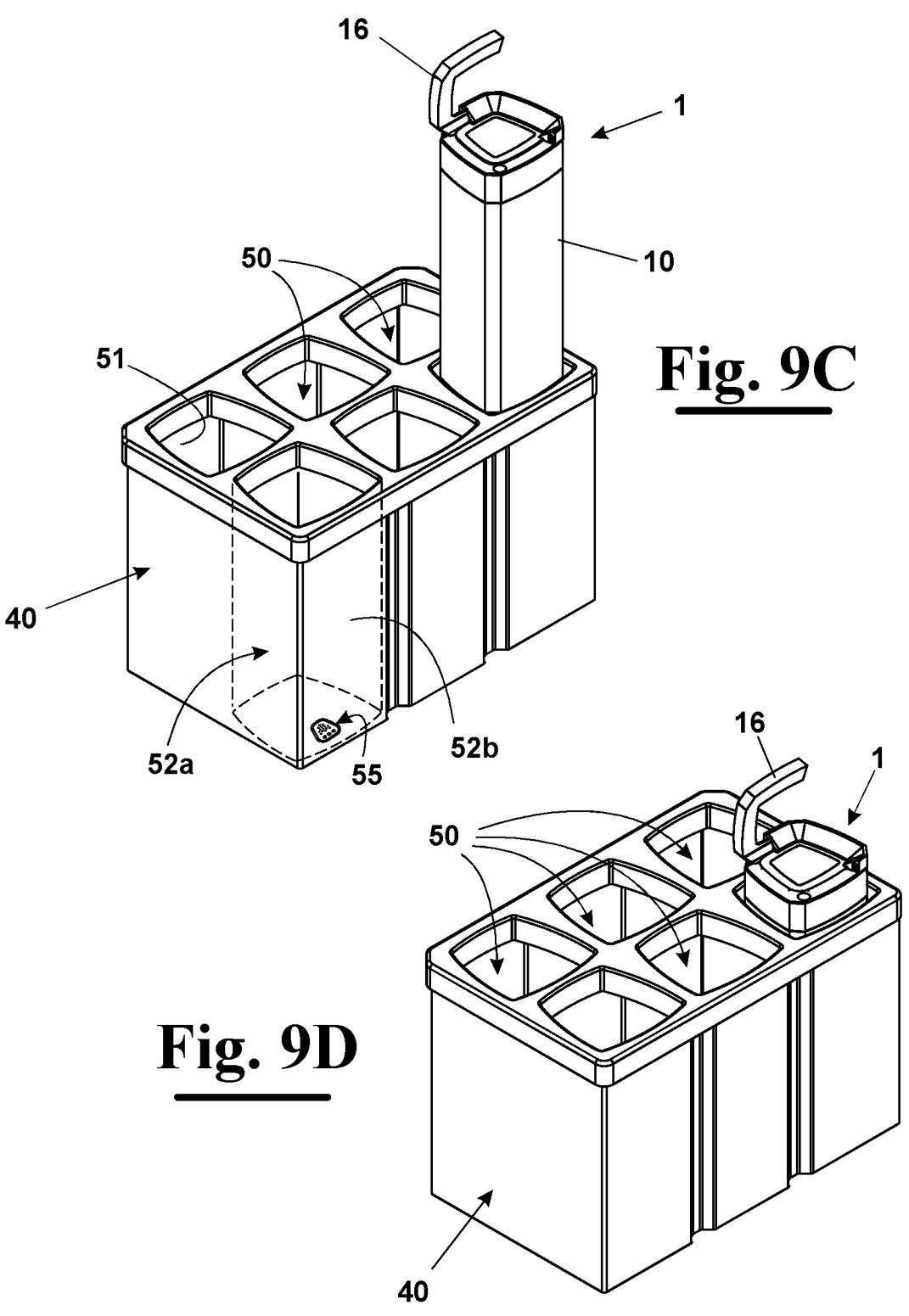
Figure 9E:
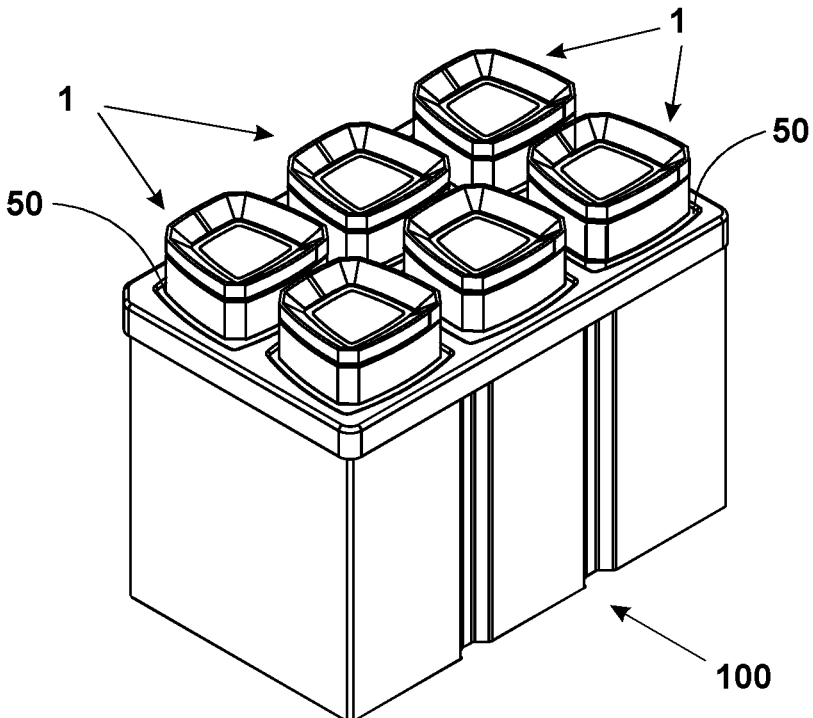
Figure 10:
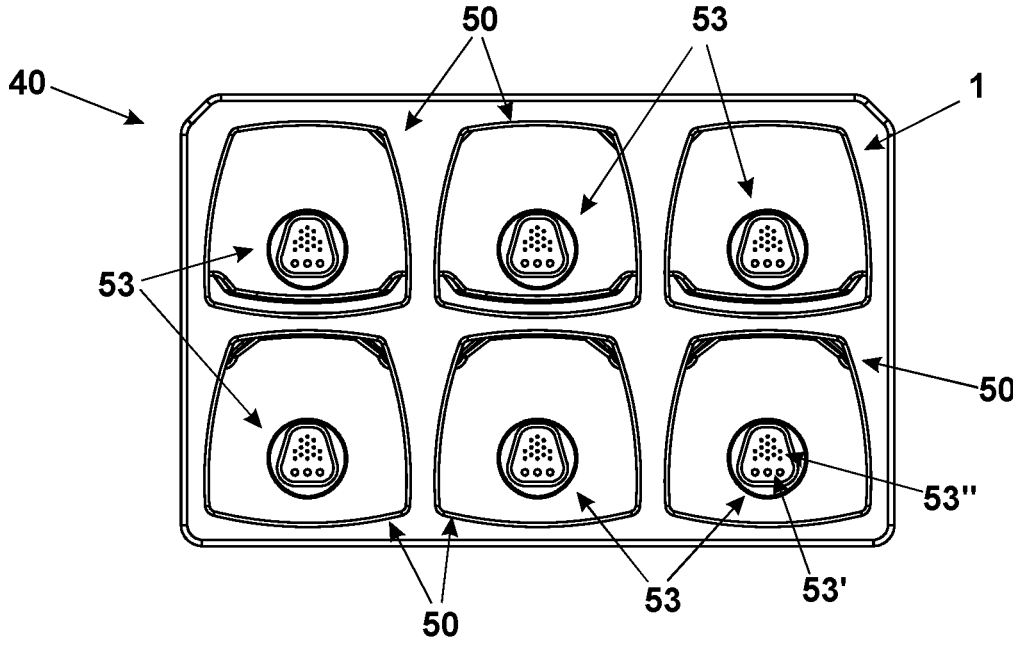
Figures 11, 12, 13:
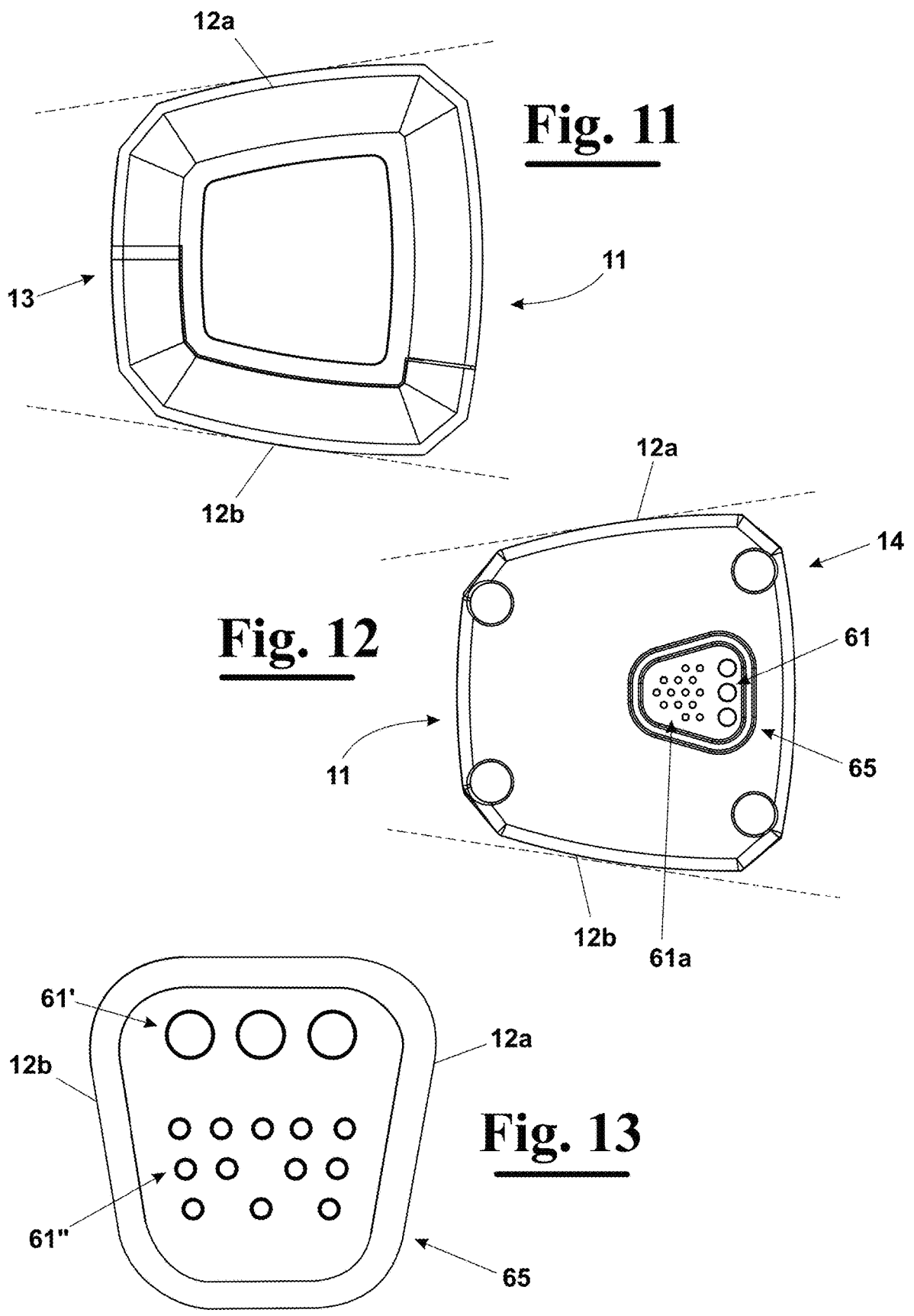
Figure 14:
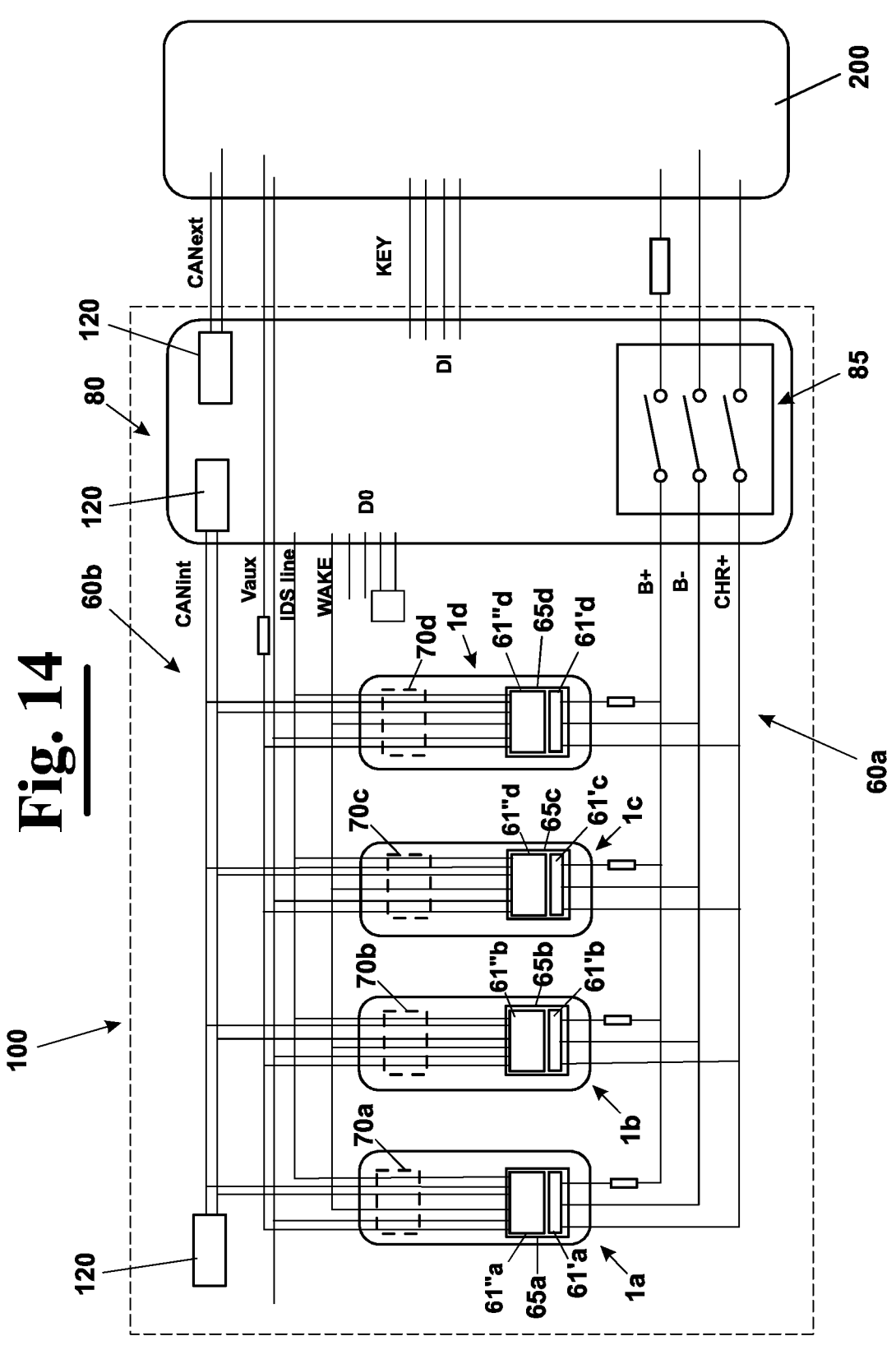
Figures 27, 28:
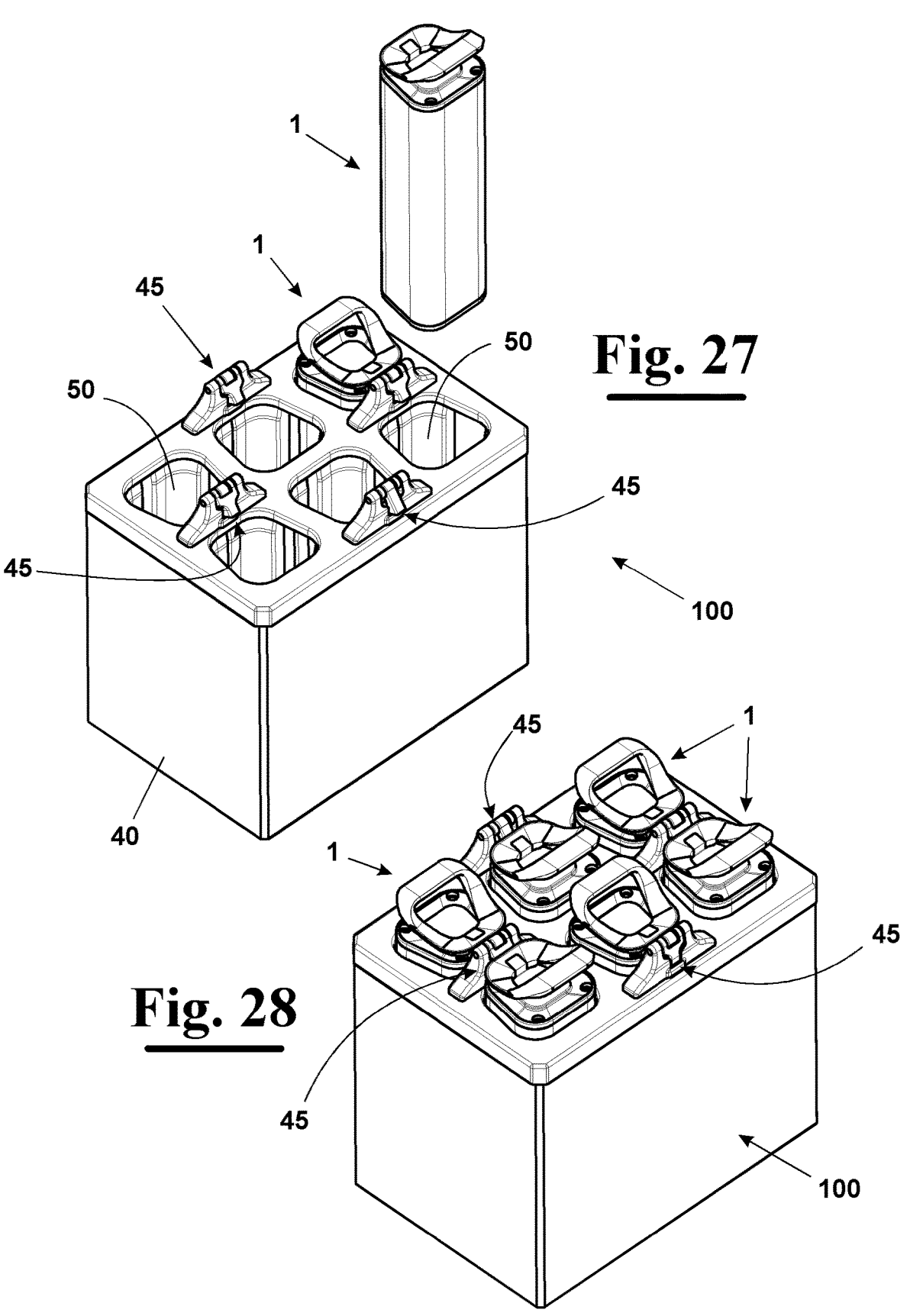
Figures 29, 30:
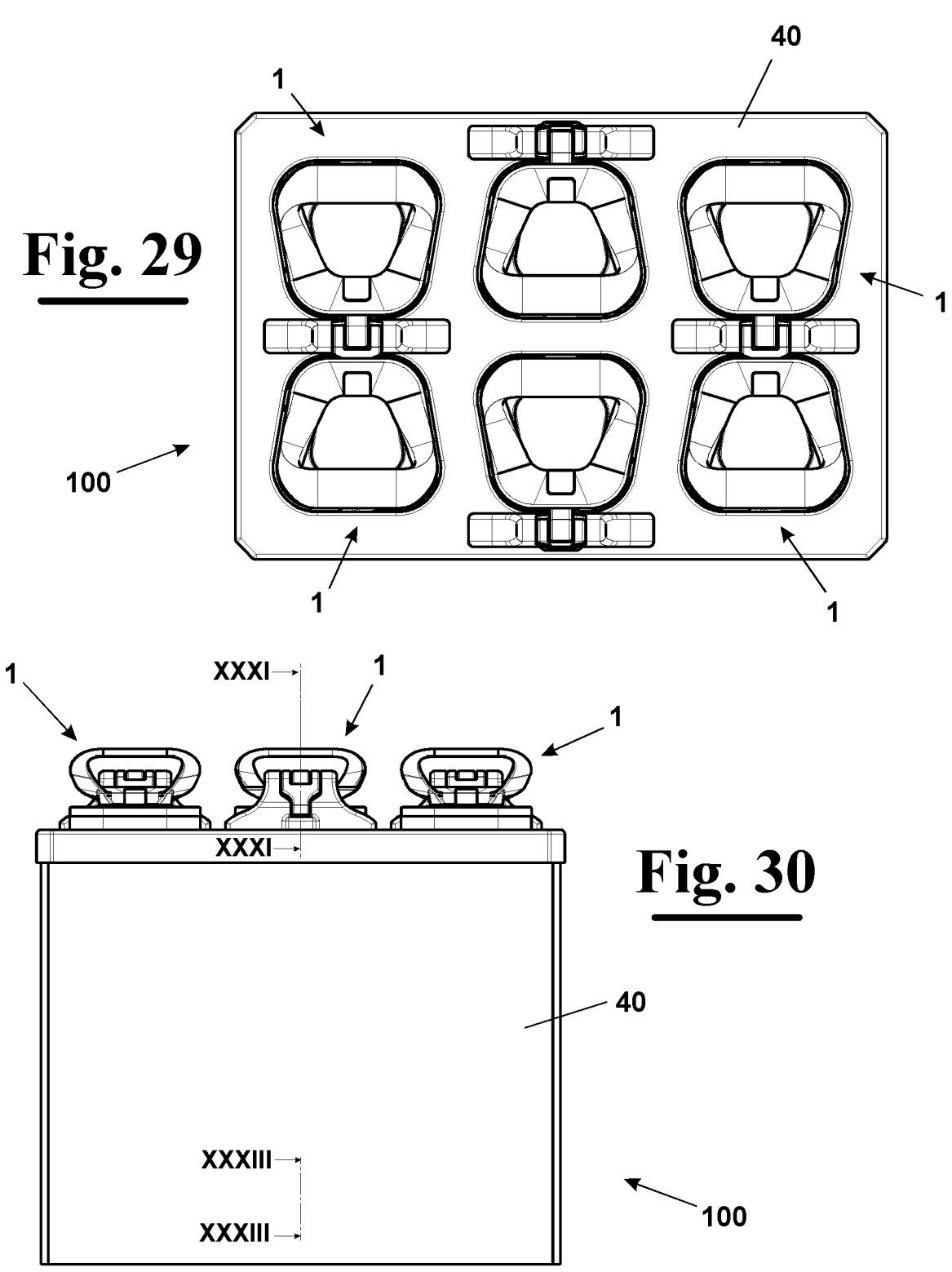
Figures 31, 32, 33:
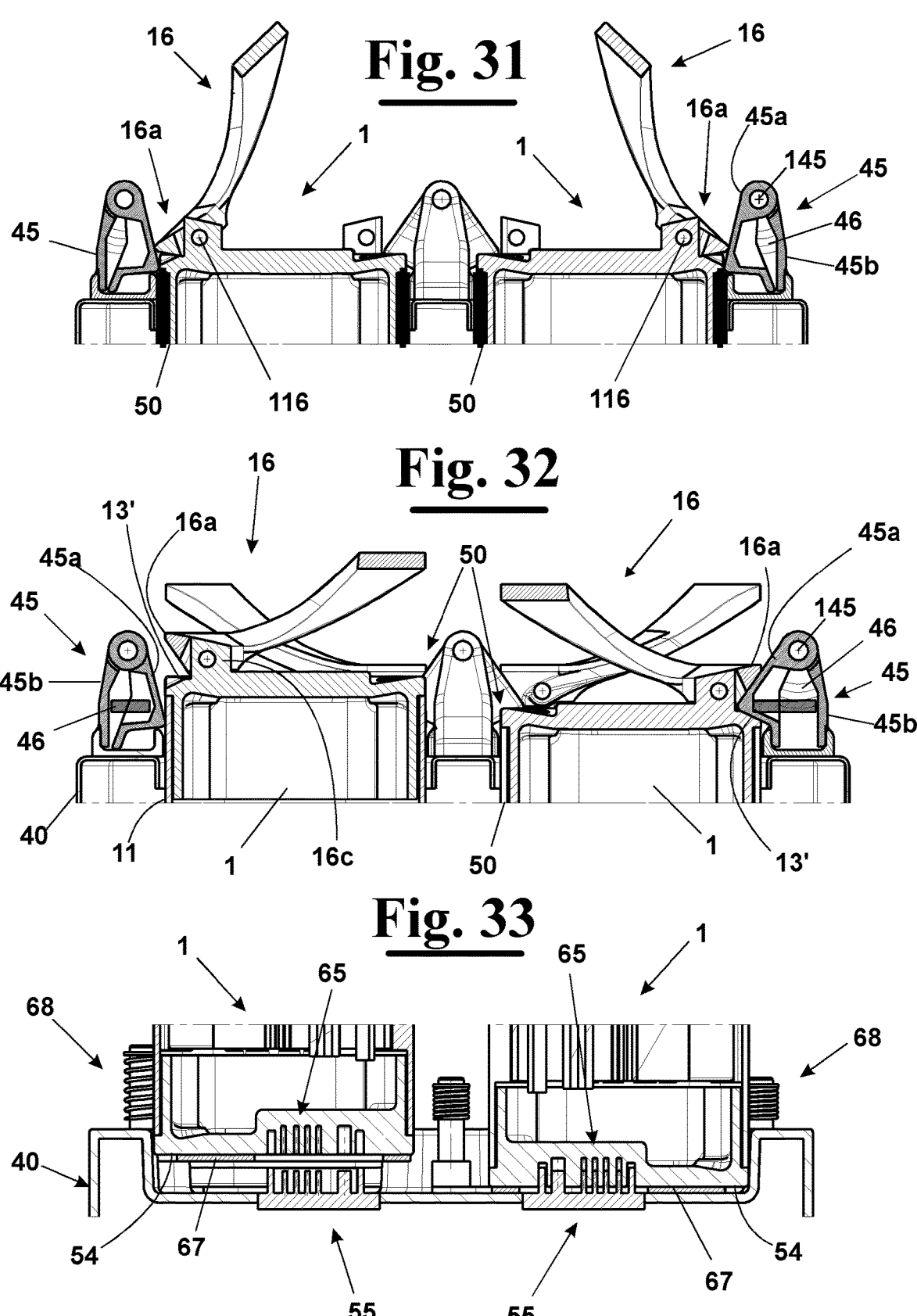
Figures 34, 35, 36:
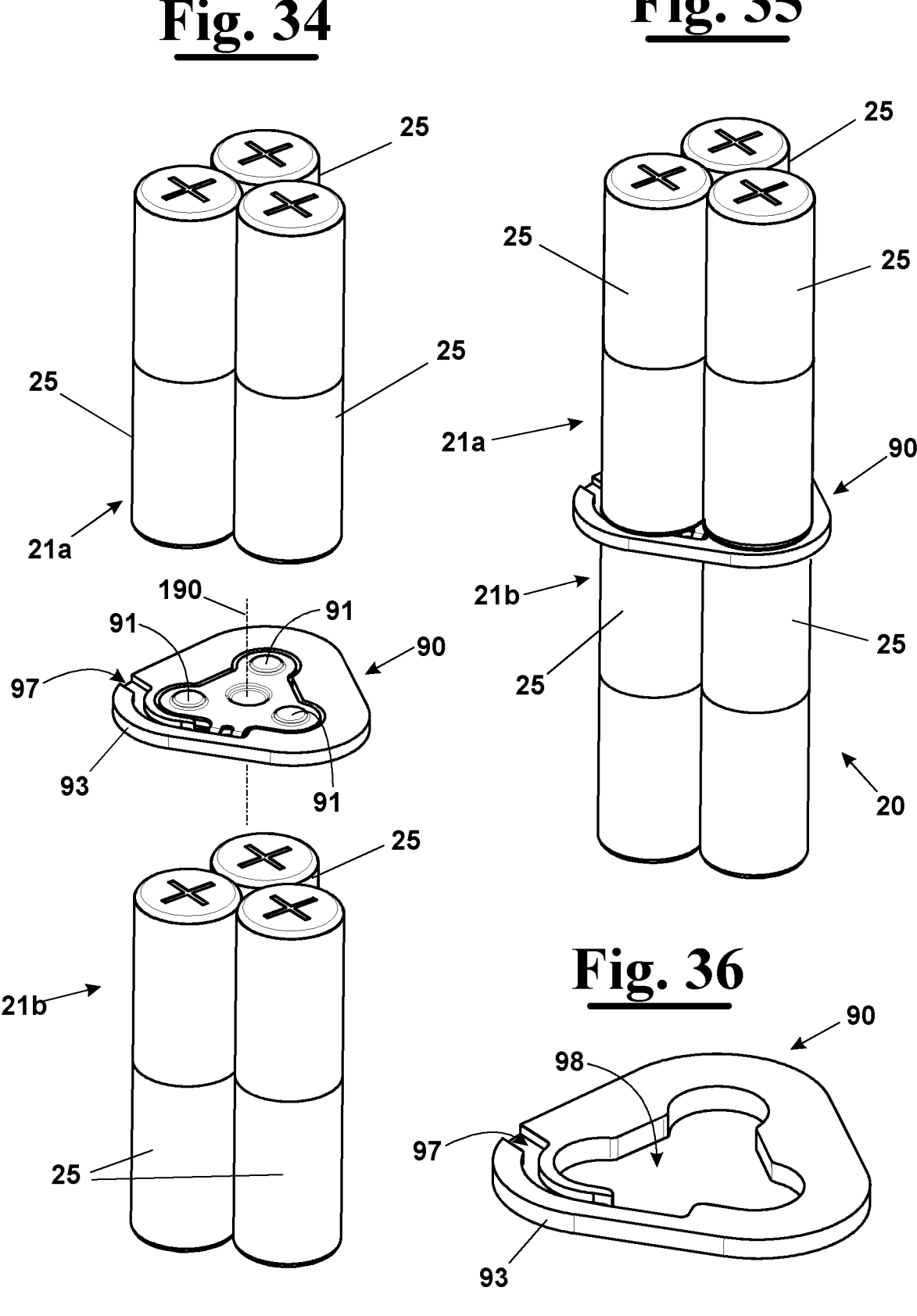
Figures 37, 38, 39:
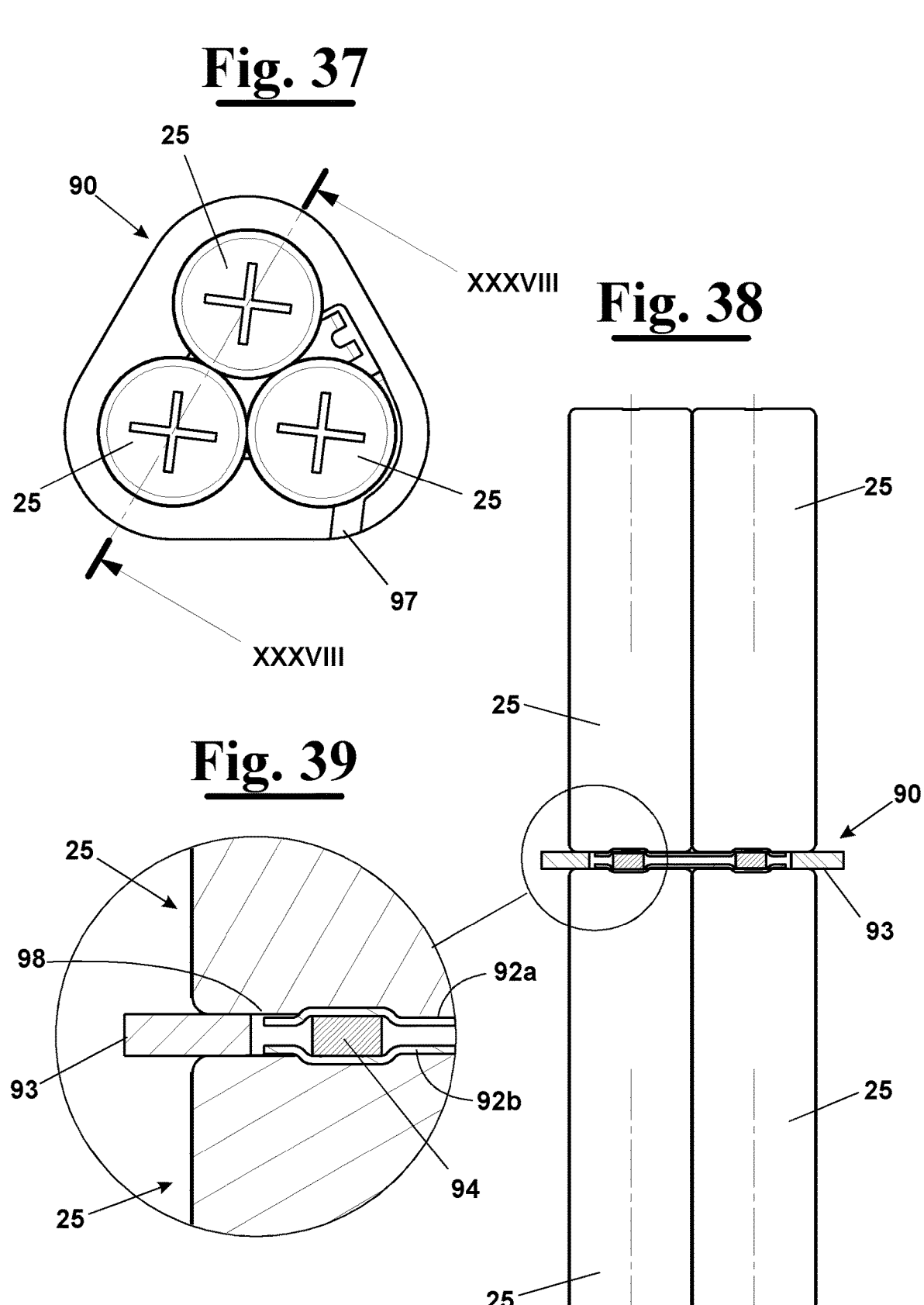
Figure 40:
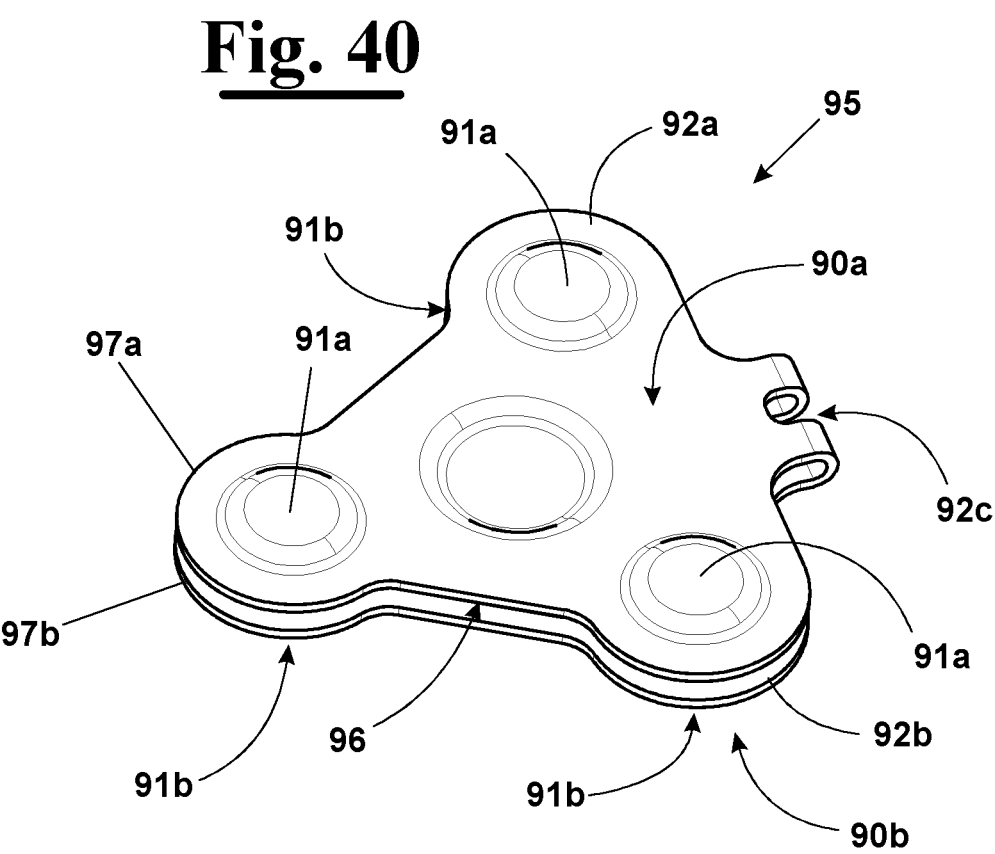
Figure 41:
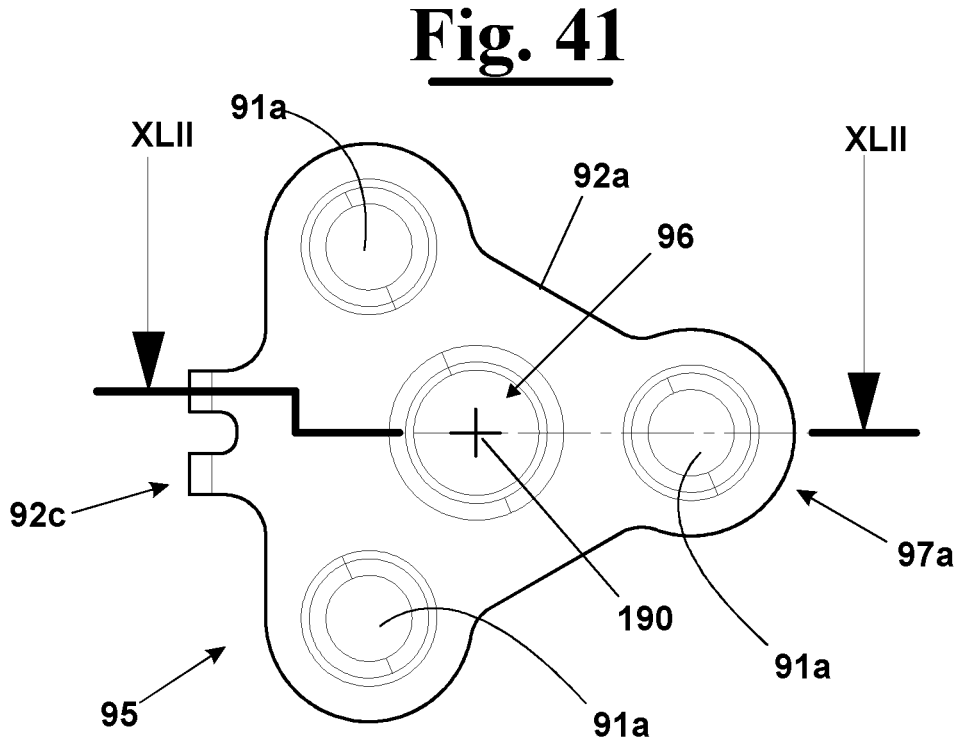
Figures 42, 43A, 43B:
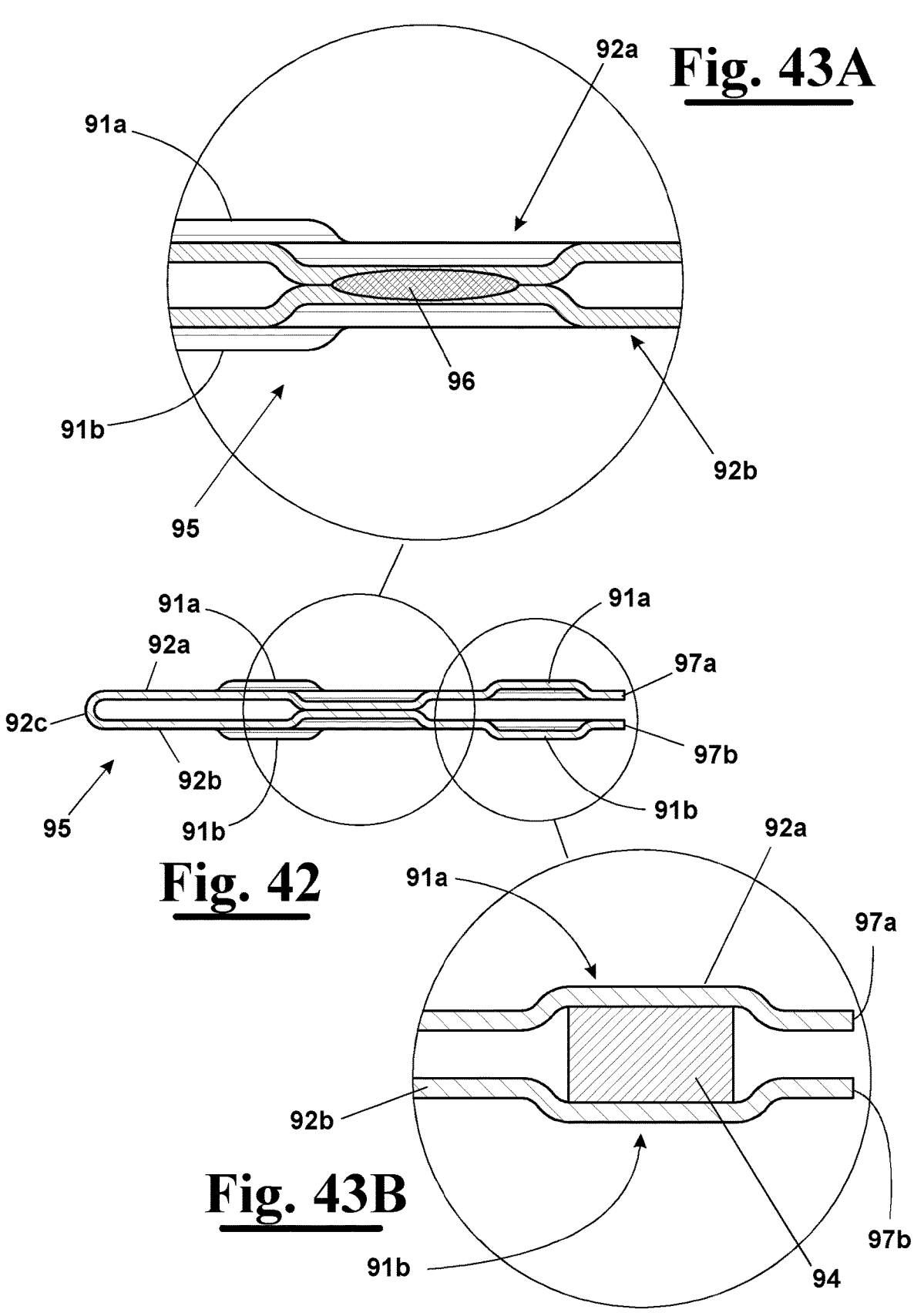
Figure 44:
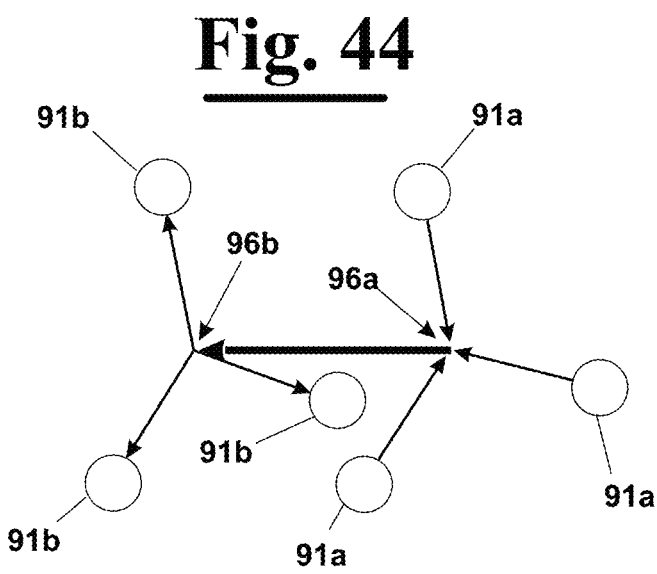
Figure 45:
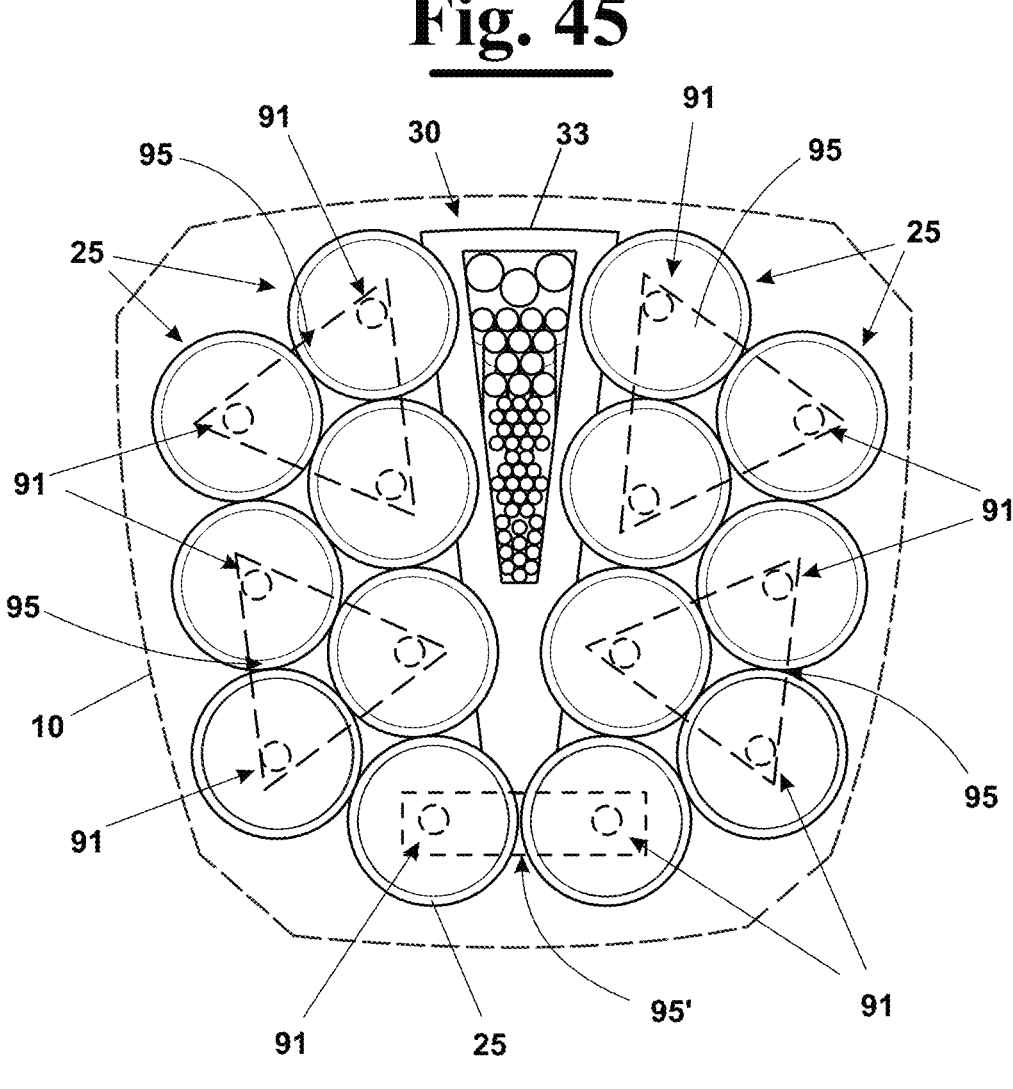

the FIGS. 7A and 7B show another alternative embodiment of the supply device of FIG. 1, respectively in a rest position and in a grasp position of the handle portion of which is provided with;

FIG. 8 diagrammatically shows a longitudinal section view of a possible embodiment of the supply device, according to the invention;

the figures from 9A to 9D diagrammatically show perspective side elevation views of a possible sequence of steps through which is possible to introduce a series of supply devices into respective housing seats of a battery housing to form a supply system according to another aspect of the invention;

FIG. 9E diagrammatically shows a perspective side elevation view of a supply system according to the invention;

FIG. 10 shows a plan view of a possible embodiment of a containment body provided with the supply system according to the invention;

FIG. 11 diagrammatically shows a plan view of a supply device according to the invention to highlight some geometric characteristics of the first end wall;

FIG. 12 diagrammatically shows a vista dal basso of a supply device according to the invention to highlight some geometric characteristics of the second end wall;

FIG. 13 diagrammatically shows in a plan view a possible embodiment of a connector foreseen by the supply device according to the present invention;

FIG. 14 shows a possible scheme of the modular supply system according to the invention;

the figures from 15 to 23 show some possible functioning schemes of some embodiments of supply system according to the invention;

the figures from 24 to 26 show, respectively, a front elevation view, a side elevation view, and a perspective view, of an alternative embodiment of the supply device of FIG. 1;

FIG. 27 shows a perspective side elevation view of an alternative embodiment of the modular supply system of the figures from 9A to 10 with some supply devices housed within the battery housing;

the FIGS. 28, 29 and 30 show, respectively a perspective side elevation view, a plan view, and a side elevation view of the modular supply system of FIG. 27 with all the housing seats of the battery housing occupied by respective supply devices;

FIG. 31 diagrammatically shows section view according to the arrows XXXI-XXXI, the upper portion of FIG. 30 with the respective handles arranged in an unblocking configuration;

FIG. 32 diagrammatically shows section view according to the arrows XXXI-XXXI the upper portion of FIG. 30 with a handle arranged in a blocking configuration and the other one in an unblocking configuration;

FIG. 33 diagrammatically shows a section view according to the arrows XXXIII-XXXIII, the lower part of the supply devices of FIG. 30 housed within the respective housing seats of the battery housing to highlight some technical characteristics;

the FIGS. 34 and 35 show, respectively, a disassembled perspective side elevation view and an assembled perspective side elevation view of a further alternative embodiment of the supply device according to the invention;

FIG. 36 shows a perspective side elevation view of a component of the supply device of FIGS. 35 and 36;

FIG. 37 shows in a plan view the supply device of FIG. 35;

FIG. 38 shows the supply device of FIG. 37 in a section view according to the arrows XXXVIII-XXXVIII;

FIG. 39 shows an enlargement of a portion of FIG. 38;

the FIGS. 40 and 41 show, respectively, a perspective view from the above and a plan view the electrical connection member provided by the supply device of FIG. 35;

FIG. 42 shows a section according to the arrows XLVII-XL VII of the supply device of FIG. 41;

the FIGS. 43A and 43B are enlargements of different portions of FIG. 42;

FIG. 44 shows a schema of the passaggio of the current from the first to the second plate portion of the electrical connection member provided by the supply device of FIG. 35;

FIG. 45 diagrammatically shows a possible layout of a supply device adopting a series of interposition members provided by the supply device of FIG. 35.

DETAILED DESCRIPTION OF SOME EXEMPLARY EMBODIMENTS OF THE INVENTION

As diagrammatically shown in FIG. 1, according to a first aspect of the invention, a supply device 1 to supply in general an electric device, and in particular a hybrid, or electric, vehicle such as a scooter, a vehicle a 3 or more wheels, but also an electric bicycle, comprises a tubular body 10 configured to contain a battery pack 20 formed by a plurality of cells 25 organized in a predetermined number of layers of cells, for example 3 layers of cells 21a, 21b, and 21c. In particular, as shown in FIG. 1, the tubular body 10 can have a substantially prismatic shape, but however it is not excluded that the same can have a different shape, for example a cylindrical shape.

Figure 2:
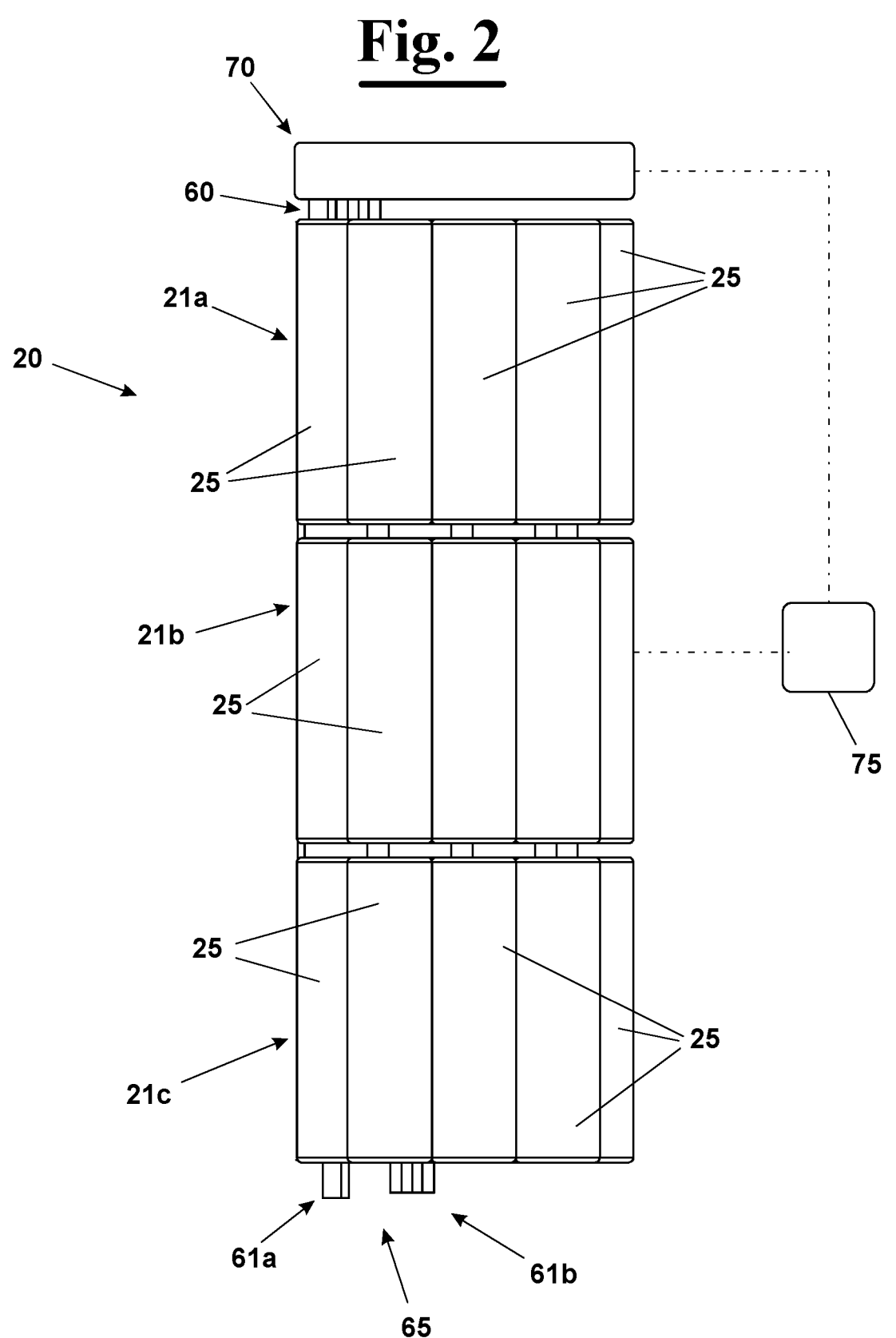
FIG. 2 diagrammatically shows a side elevation view of a possible embodiment of a battery pack housed within the supply device of FIG. 1.

According to an embodiment diagrammatically shown in FIG. 2, the tubular body 10 of the supply device 1 can be configured to contain a battery pack formed by 3 layers of superimposed cells 21a, 21b and 21c. In particular, the cells 25 of each layer of cells 21a, or 21b, or 21c are connected in series with each other. The different layers of cells 21a, 21b and 21c are, preferably, connected in parallel with each other.

The supply device 1 can comprise, furthermore, a control unit 70 operatively connected to the battery pack 20, in particular through a plurality of connection cables 60, 60a, 60b and 60c. More precisely, the control unit 70, or "BMC" Battery Management Control, is configured to monitor the state of functioning and to manage the state of charge of the battery pack 20. In particular, the control unit 70 is arranged to guarantee that the battery pack 20 operates correctly in such a way to keep the same efficient and safe, for example indicating any malfunction. Furthermore, a plurality of connection cables 60, 60a, 60b, and 60c is provided arranged to connect the battery pack 20 and the control unit 70 to a connector 65 provided with a predetermined number of electrical contacts 61. In particular, the connection cables 60, 60a, 60b, and 60c can comprise power cables, and/or balance cables, and/or of transport signal cables. More precisely, the connector 65 can comprise at least a first group of electrical contacts 61', in particular contacts for power cables, and at least a second group of electrical contacts 61", in particular contacts for transport signal cables.

Figures 3, 4:
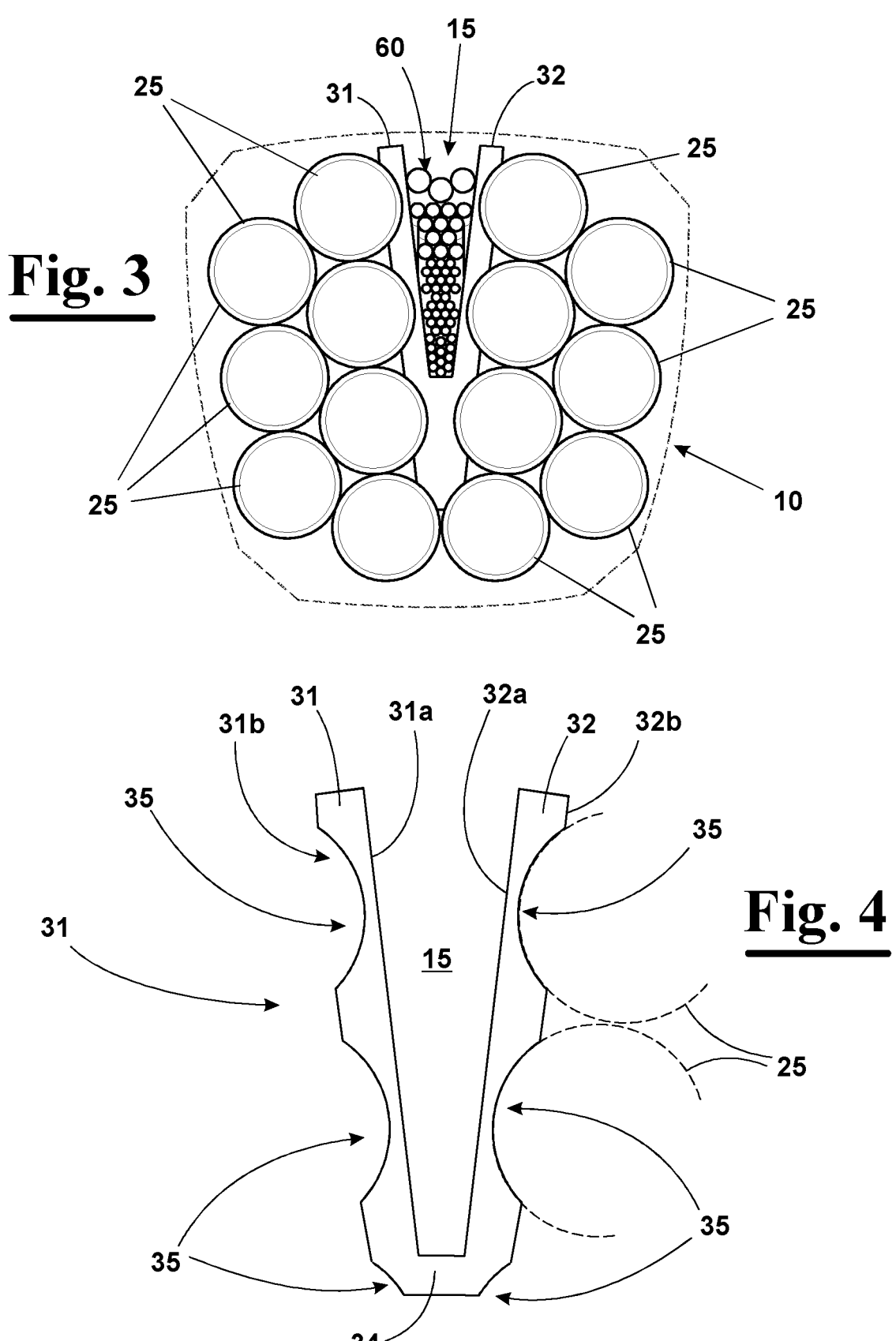
FIG. 3 diagrammatically shows a plan view of a possible embodiment of a separation member according to the invention defining a housing channel for the electric cables of the device.
FIG. 4 diagrammatically shows a plan view of a possible embodiment of a separation member that can be used by the supply device according to the invention.

In particular, according to the invention, each layer of cells 21a, 21b, and 21c comprises at least a first group 25a of cells 25 and a second group 25b of cells 25. In the example of FIG. 3 the first and the second group 25a and 25b of cells 25 are formed by the same number of cells 25, in particular from 7 cells 25 each. In general, however, the number of cells 25 of the first group of cells 25a can be equal to, or different from, the number of cells 25 of the second group of cells 25b. More in detail, between the first group 25a and the second group 25b a housing channel 15 is defined arranged to contain, in use, the aforementioned plurality of connection cables 60, 60a, 60b and 60c.

As diagrammatically shown in FIG. 8, the different housing channels 15 of single layers 21a, 21b and 21c are superimposed to each other in such a way to form a single housing channel 15, which extends longitudinally for the whole length of the battery pack 20 (see at this regard FIG. 8).

As diagrammatically shown in FIG. 1, the supply device 1 can be provided with a first end wall 13 and at least a second end wall 14, in particular arranged at opposite sides with respect to the tubular body 10. In particular, the first and/or the second end wall 13 and 14 and the tubular body 10 can be configured to move from a position of mutual engagement, for example by a shape coupling, to a disengagement position, and vice versa. In this way, it is possible to easily reach the battery pack 20 contained within the supply device 1 in order to remove the same, or introduce a battery pack 20 into the empty space, as well as to carry out maintenance operations on the device.

Advantageously, the supply device 1 comprises, furthermore, at least a measurement sensor 75, diagrammatically shown in FIG. 2, configured to measure preferably the voltages and/or the currents and/or the temperature of the cells 25. In particular, the, or each, aforementioned measurement sensor 75 is operatively connected to the control unit 70. Preferably, an indicator 23 is, furthermore, provided indicating the state of charge, or SOC, from the English acronym State of Charge, of the battery pack 20, normally defined as percentage values from a minimum value of 0% (battery pack 20 completely discharged) to a maximum value of 100% (battery pack 20 completely charged), for example positioned at the aforementioned end wall 13, on which the measurement of the level of charge detected by the, or each measurement sensor 75 is displayed.

The second end wall 14, or bottom wall, is, in particular, provided with a second connector 65 provided with the aforementioned electrical contacts 61. These can be arranged to supply, or absorb, a determined electric power to the device supplied by the supply device 1, for example the hybrid, or electric, vehicle as anticipated above, but can be also used to absorb the current that is necessary to recharge the battery pack 20. According to a preferred embodiment, the aforementioned housing channel 15 can be delimited by at least a first lateral containment wall 31 and a second lateral containment wall 32. More in detail, la first and la second lateral containment wall 31 and 32 can protrude longitudinally to the tubular body 10 for all its length, or anyway for all the length of the battery pack 20. Advantageously, the first lateral containment wall 31 and the second lateral containment wall 32 can be provided with a first surface 31a and 32a facing towards the aforementioned channel 15 and arranged to contain laterally the aforementioned plurality of connection cables 60, 60a, 60b and 60c, and of a second surface 31b and 32b, opposite to the first surface 31a, and 32a. The second surfaces 31b and 32b are, advantageously, provided with a plurality of longitudinal grooves 35, for example 4 grooves 35 each surface 31b and 32b in the case of FIG. 3, or 3 grooves 35 in the case of FIG. 4. In particular, the grooves 35 are configured to house, in use, a portion of a respective cell 25 of the first group 25a and of the second group 25b of cells, respectively. Therefore, the grooves 35 have a radius of curvature substantially equal to the radius of curvature of the cell 25 which is destined to house the same. In this way, it is possible to minimize the increase in the lateral dimension caused within the battery pack 20 by the lateral containment walls 31 and 32.

Figure 5:
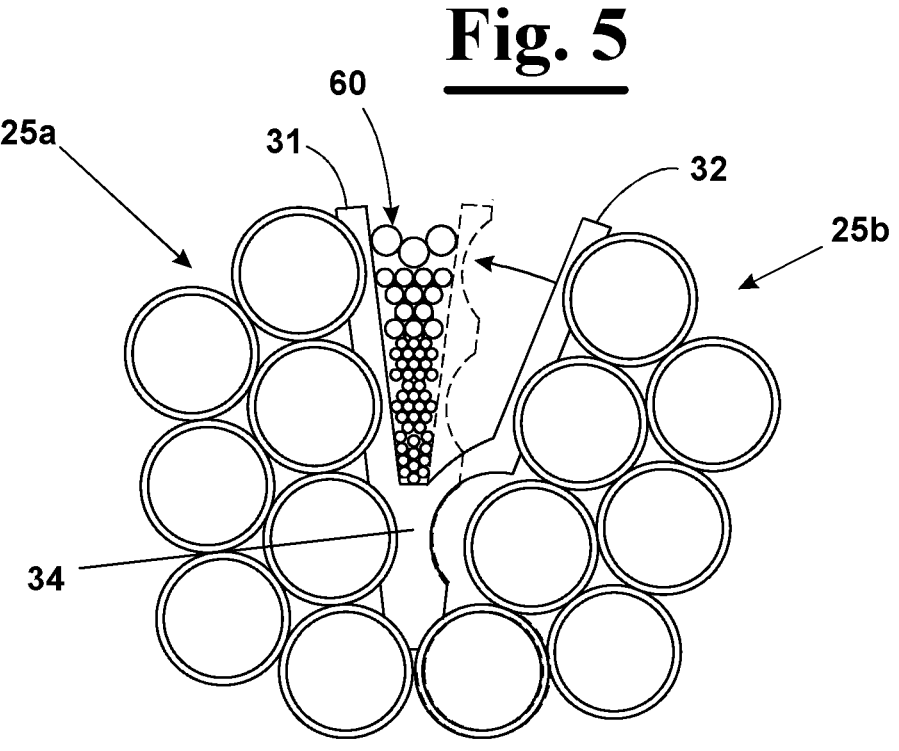
FIG. 5 diagrammatically shows a plan view of a possible alternative embodiment of the separation member of FIG. 3, in a spaced position and in a close position.

According to a preferred embodiment of the invention, the first lateral containment wall 31 and the second lateral containment wall 32 can be configured to move one with respect to the other between a spaced position (unbroken line in FIG. 5) and a close position (broken line in FIG. 5). In particular, the first and second lateral containment walls 31 and 32 can be made of a plastic material and can be operatively connected at a connection portion 34. The movement of the lateral containment walls 31 and 32 from the close position to the spaced position can be carried out by weakening the material, for example obtained by reducing the thickness at the connection portion 34. The first containment wall 31 and the second containment wall 32 can form a separation member 30 as diagrammatically shown in the figures from 3 to 5, or can be two separated elements, case not shown in the figure.

Figure 6:
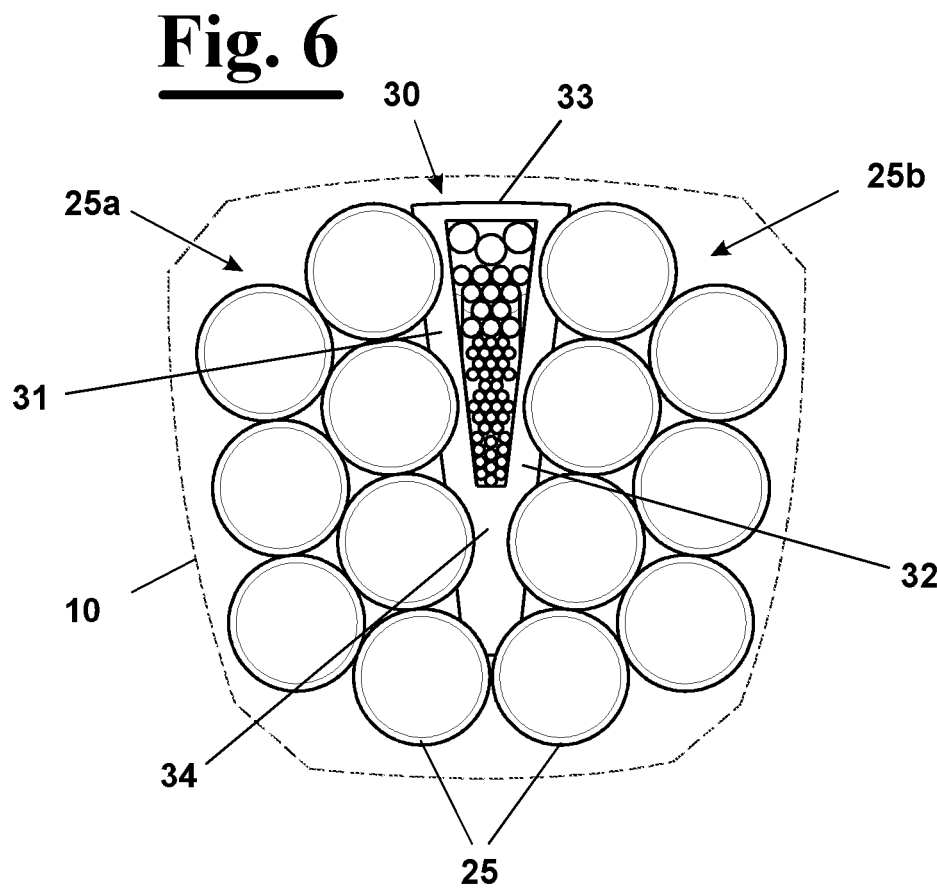
FIG. 6 diagrammatically shows in a plan view another alternative embodiment of the separation member of FIG. 3 according to the invention.

According to an embodiment foreseen and diagrammatically shown in FIG. 6, the separation member 30 can be provided with a third containment wall 33, in such a way to form a body having a triangular, or substantially triangular, shape.

In particular, the third containment wall 33 can be, for example, engage/disengage to/from at least one of the aforementioned first and second lateral containment walls 31 and 32, or can provide two portions 33a and 33b able to approach, or depart from, each other.

According to the embodiment of the invention that is diagrammatically shown in the FIGS. 7A and 7B, the supply device 1 can be, advantageously, provided with a handle portion 16. This is, in particular, configured to move between a rest position, where it forms a perimeter edge 17 of the first end wall 13 (FIG. 7A), and a grasp position, where the handle portion 16 is inclined with respect to the first end wall 13, for example at an angle comprised between 30° and 120°, in particular equal to 90°, to allow a user to easily grasp the same (FIG. 7B). The aforementioned handle portion 16 is extended substantially for half of the perimeter edge 17 of the first end wall 13. More precisely, the perimeter edge 17 can be formed by a fixed portion 18 and from the aforementioned handle portion 16 mobile with respect to the fixed portion 18. According to an embodiment the fixed portion 18 and the handle portion 16 are provided with respective engagement members, for example a protrusion 19a and a recess 19b, arranged to provide a mutual engagement at the aforementioned rest position of the handle portion 16.

This embodiment of the invention is advantageous, in particular, to remove, or introduce, the supply device 1 from, or into, a battery housing 40 as described in detail later with reference to the figures from 7A to 7D.

Figures 24, 25, 26:
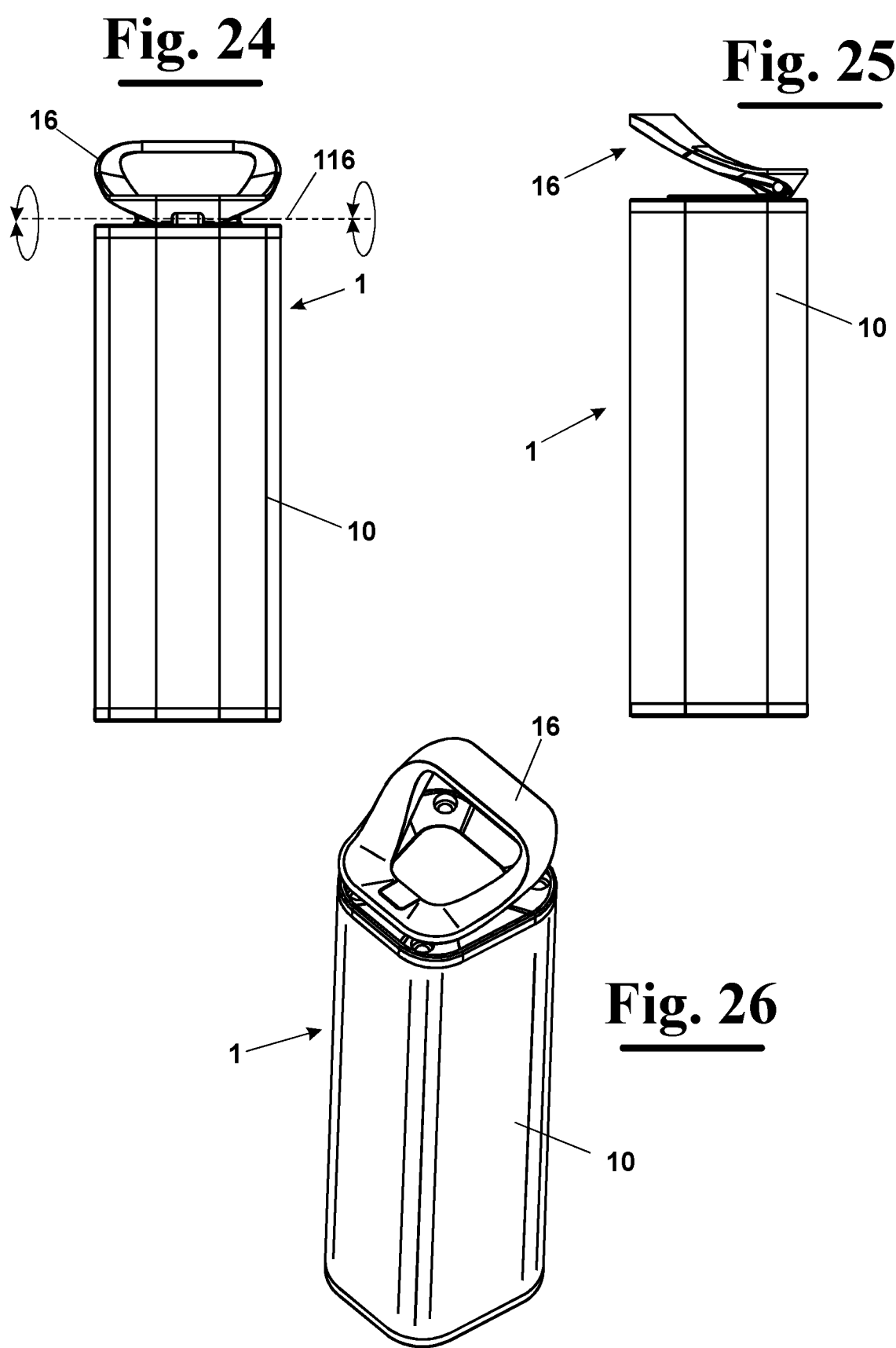

According to an alternative embodiment foreseen and diagrammatically shown in the figures from 24 to 26, the handle portion 16 of the supply device 1 can have a closed geometry. For example, as shown in FIGS. 7B and 24, for two different embodiments, the handle portion 16 can be configured to rotate about a rotation axis 116 substantially orthogonal to the tubular body 10 of the supply device 1.

In particular, as diagrammatically shown in FIG. 7B, the handle portion 16 can be provided with blocking member, for example a tooth 19a protruding from the handle portion 16, not shown in FIG. 7B, and arranged to engage a respective recess 19b provided at the perimeter edge 18.

According to the alternative embodiment shown in the figures from 24 to 26, the handle portion 16, also in the rest position, is inclined at a predetermined angle with respect to the upper end wall 13. In this way, it is easier for the user to grasp the handle in order to move the same from the rest position of FIG. 32 to the grasping position of FIG. 31.

According to another aspect of the invention, a modular supply system 100, in particular to supply an electric, or hybrid, vehicle, 200 provides a battery housing 40 comprising a plurality of housing seats 50, advantageously having a substantially prismatic shape. In particular, each housing seat 50 is provided with a respective first connector 55 comprising a respective plurality of electrical contacts 53 diagrammatically shown in FIG. 10, and one of which is diagrammatically also shown in FIG. 9C. In this case, a plurality of supply devices 1 is, furthermore, provided having a substantially prismatic shape and configured, as described above, to contain at least a respective battery pack 20 formed by a plurality of cells 25, advantageously organized in a plurality of layers 21a, 21b, and 21c. In particular, each supply device 1 is arranged to move from a position external to the battery housing 40, to an internal position, where is arranged to engage into a respective housing seat 50 of the battery housing 40. More in detail, in the aforementioned internal position, the second connector 65 of each supply device 1 is arranged to be connected to a respective first connector 55, to supply a predetermined electric power.

In the case shown as an example in the figures from 7A to 7D, the battery housing 40 has 6 housing seats 50, the possibility is, however, foreseen that the battery housing 40 can have a different number of housing seats 50. A person skilled in the art will have no difficulty to understand that the battery housing 40, according to the invention, can be provided, in general, with a number of housing seats 50 equal to, or greater than 2, for example a number comprised between 2 and 20, in particular depending on the type of vehicle to be supplied, or however on the requested electric power, without departing from the inventive concept of the invention.

In particular, the supply devices 10 and the housing seats 50 are configured to provide a shape coupling. More precisely, the supply devices 1 are provided with lateral surfaces 11 comprising at least a first and a second converging side 12a, 12b (see FIGS. 11 and 12). Analogously, the housing seats 50 are provided with lateral surfaces 51 comprising at least a first and a second converging sides 52a, 52b (FIG. 9C). Preferably, both the supply device 1 and the housing seats 50 can have a substantially trapezoidal transverse section.

This particular technical solution allows, in particular, to simplify the movement of the supply devices 1 from the external position (FIG. 9A) to the internal position (FIG. 9D), and vice versa, with respect to the housing seats 50.

As shown in detail in FIG. 13, according to a particularly advantageous embodiment of the invention, also the aforementioned connector 65 of which the supply device 10 is provided with, has a first and a second converging sides 65a and 65b. For example, the connector 65 can have a substantially trapezoidal transverse section. In particular, this particular geometry of the connector 65 allows to follow the geometry of the supply device 10 and, therefore, to keep the cells 25 of the battery pack 20, as well as the connection cables 60, 60a, 60b and 60c housed within the housing channel 15, in a predetermined correct position. Furthermore, the aforementioned trapezoidal shape allows to obtain an asymmetric geometry of the connector 65 that guides the positioning of the supply device 1, thus avoiding to erroneously position the same with respect to the battery housing 40, or the recharge device if present, also this, in case, provided with housing seats within which the supply device 1 can be positioned to recharge the same, once that the cells 25 reach a determined level of charge SOC.

An electric scheme of the modular supply system 100 according to the invention is, for example configured to house 4 supply devices 1a-1d, is shown as an example in FIG. 14. In this case, the modular supply system 100 is, for example, provided with a central control unit 80, also this like the control unit 70 similar to a BMS. In particular, the central control unit 80 is operatively connected to the control unit 70 configured to monitor the state of functioning of the different supply devices 1a-1d and al vehicle supplied by system 100. More in particular, the central control unit 80 can be configured to monitor the state of functioning and to manage the state of charge of the different supply devices 1a-1d forming the system 100, i.e. the discharge and the charge steps. More in particular, the central control unit 80 is arranged to electrically connect the different control unit 70 of the supply devices 1a-1d provided within the battery housing 40 and to electrically connect the system 100 with the electric, or hybrid, vehicle, 200 to be supplied. Furthermore, the central control unit 80 is arranged to transmit/receive signals to/from the diverse control unit 70 of the supply devices 1a-1d forming the system 100 and, advantageously, to/from the vehicle 200 connected to the system 100, in particular, in such a way to elaborate the different signals received and transmit, in case, any command.

In particular, when the supply devices 1a-1d of which the system 100 is provided with are housed in respective housing seats 50a-50d of the battery housing 40, the aforementioned electrical connection is obtained by the aforementioned first and second connectors 65-65d and 55a-55d. More precisely, the first group of electrical contacts 61'a-61'd of the first connectors 65a-65d is connected to a first group of electrical contacts 53', for example 4 electrical contacts 53'a-53'd of the first connector 55 of the housing seats 50 of the battery housing 40. In this way, it is possible to supply electric power from the battery packs 20a-20d of the different supply devices 1a-1d to the system 100 by the power cables 60, 60a, 60b and 60c and from the supply system 100 to the electric motor of vehicle 200, for example by a central connector 85 of interface between the supply system 100 and the vehicle 200. Furthermore, the signals from each control unit 70a-70d to the central control unit 80 are transported by connecting the second group of electrical contacts 61"a-61"d with a first group of electrical contacts 53", for example 4 electrical contacts 53"a-53"d, of the first connector 55 of which the housing seat 50 of the battery housing 40 where is housed the respective supply device 1a-1d is provided with. In particular, the modular supply system 100 can comprise a central control unit 80, or "BMS" English acronym for Battery Management System, operatively connected to a plurality of supply devices 1 by connection cables 60, 60a, 60b and 60c both power cables and signal cables for the functioning and the management of the system.

As diagrammatically shown in the embodiment of FIG. 14, the connection cables 60, 60a, 60b, and 60c of the modular supply system 100 can comprise 3 different supply lines. More in particular, the modular supply system 100 can provide a first supply line comprising the cable of the positive poles (B+) and the cables of the negative poles (B−). The supply outlet contacts both of the control unit 70 and the central control unit 80 can be "normally opened" that means that, when are not voluntarily driven by the control, the contacts 85 are not connected. The exit of the power can be engaged only in specific conditions, closing the contacts. A second supply line provides the supply cables indicated in figure with Vaux. This second supply line is provided by the supply devices 1a-1d to supply the central control unit 80 and, in case, other devices of the vehicle 200 connected to the system 100, such as the instruments display of the vehicle, the burglar alarm, the cooling fans etc., is advantageously, always present at the outlet contacts. Another line is the recharge line (CHG+, B−) provided by the outside and managed by the central control unit 80 and by the control unit 70 of the supply devices 1a-1d to recharge the cells. In particular, the recharge line is a dedicated line and separated from the first discharge line through the central control unit 80 and the control unit 70 of each supply device 1a-1d. In the control unit 70 of each supply device 1a-1d, the recharge contacts are normally opened. The inlet of charge is activated closing the contacts, only in specific conditions. A line "WAKE" is, furthermore, provided, i.e. a digital, or analogical, output for the central control unit 80 and a digital, or analogical input for the control unit 70 of each supply device 1a-1d. The "WAKE" line determines when the control unit 70 has to be reactivated in complete working conditions from a pause mode, or "sleep mode", corresponding to the case in which the control unit 70 of each supply device 1a-1d are in a state of low energy consumption". The system 100 can, furthermore, provide two transmission channels of the signals, or "CANbus", one "internal" for the communication between the central control unit 80 and the control unit 70 of the different supply devices 1a-1d, and one "external" for the communication between the central control unit 80 and the vehicle 200, if present. As shown again in FIG. 14 termination resistances 120 of the CANbus net can be, furthermore, provided. Connections for identifying the positions of the supply devices 1a-1d can be, furthermore, provided. More precisely, the supply devices 1a-1d are preferably identical to each other, therefore identifying the position of a supply device within the battery housing 40 and the differentiation of their CAN messages is possible thanks to 4 digital, or analogical, inputs defined ID, which stands for "Identificator". Still with reference to FIG. 14, with DO are indicated the Digital Outputs, with DI the Digital Inputs, preferably one of these digital inlets can be used for reading the operation signal of the KEY of the vehicle operated by the user to turn on and off the system 100".

In the figures from 14 to 23 some embodiments are shown provided by the present invention of the modular supply system 100 according to the invention. In particular, as diagrammatically shown in FIG. 15, the central control unit 80 can be arranged to divide the plurality of supply devices 1, for example the 4 supply devices 1a-1d, of which is provided with for example in 2 supply groups 110a and 110b. More in particular, the central control unit 80 is arranged to divide the aforementioned supply devices 1a-1d in supply groups 110a and 110b comprising a predetermined number N of supply devices 1a-1d. Advantageously, the number N of supply devices 1a-1d forming each supply group 110a, 110b, is primarily set in such a way that, when the level of charge, or SOC, of the supply devices 1a-1d is maximum, the power that can be supplied by each group 110a, 110b, is sufficient to assure the maximum electric power requested by the vehicle 200. The number N of supply devices 1a-1d is, therefore, in general determined by the type of vehicle 200 to be supplied. For example, in the case of determined appliances, for example in the case that the vehicle 200 is an electric bicycle, each supply group 110a, 110b is formed by only 1 supply device 1, in the case of an electric scooter 200 each supply group 110a, 110b is, for example formed by 2 supply devices, and precisely the first supply group 110a is formed by the supply devices 1a and 1b and the second supply group 110b from the supply devices 1c and 1d, respectively, whilst in the case of an electric mini-car, the number N of supply devices 1 which form each group can be 3, or 4, and so on.

Figure 15:
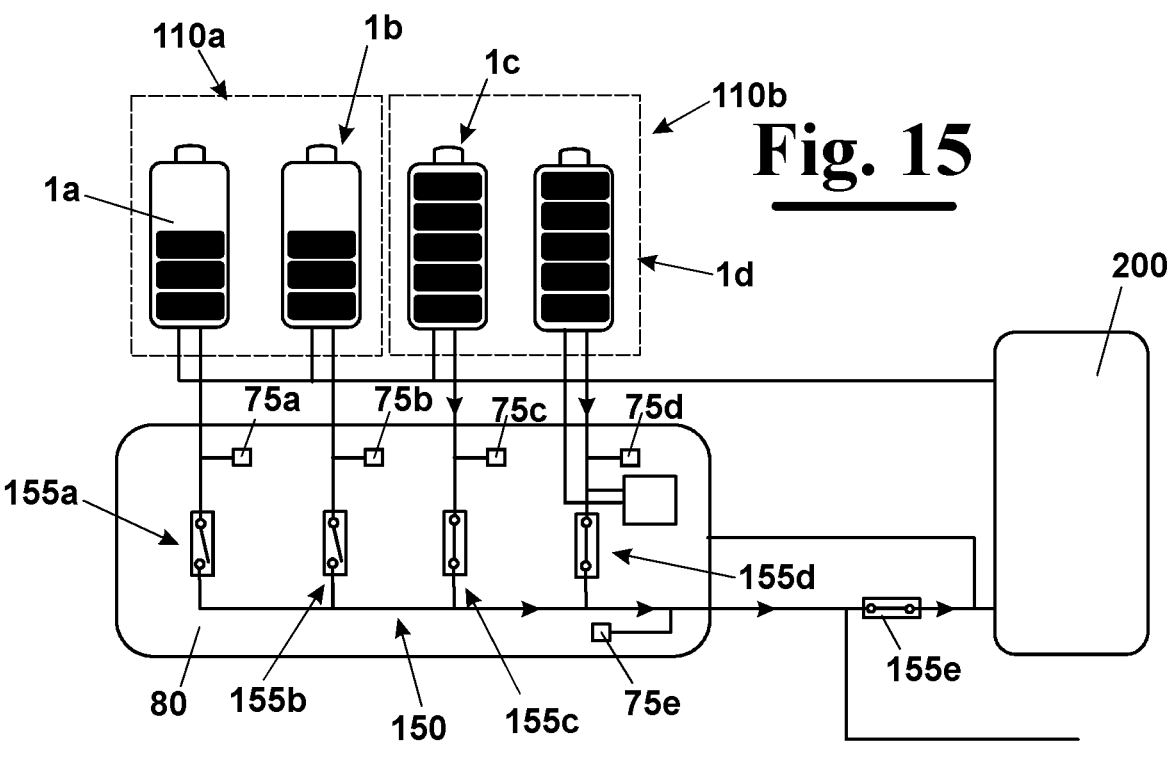

In particular, the central control unit 80 is arranged to associate to a supply group 110a, 110b, for example in the case of FIG. 15 to each of the 2 supply groups 110a and 110b, the supply devices 1a-1d between those that are present in the system 100 having the same level of charge, or SOC, or anyway a level of charge within a predetermined value of tolerance $\Delta_{SOC}$*, for example with a $\Delta_{SOC}$ equal to 5% of the value of the level of charge, therefore the 2 supply devices have a level of charge SOC1 and SOC2 such that SOC1–SOC2=$\Delta_{SOC}$*.

In FIG. 15, for example the first supply group 110a is formed by the supply devices 1a and 1b with a level of charge, or SOC, equal to about 60% of the maximum value $SOC_{max}$, whilst the second supply group 110b is formed by the supply devices 1c and 1d with a level of charge equal to about 100% of the maximum value $SOC_{max}$. once that at least a supply group 110a, 110b comprising two consistent supply devices 1a-1d, i.e. having a difference in the level of charge $\Delta_{SOC}$ equal to the aforementioned value of tolerance $\Delta_{SOC}$*, is identified, the central control unit 80 is arranged to connect, for example by a suitable electric circuit 150 comprising a series of switches ON/OFF, or driver of current 155, the consistent supply devices 1, i.e. those formed by the aforementioned supply group 110a, 110b, to the electric vehicle 200 to be supplied, and to disconnect, instead, the other supply devices 1. In the case that, instead, the supply groups 110a and 110b of consistent supply devices 1 are more than 1, the central control unit 80 is arranged to connect to the electric vehicle 200 the supply group 110a, 110b with the highest level of charge. For example, in the case of FIG. 15, since the supply groups 110a and 110b of consistent supply devices are 2, i.e. the group 110a comprising the supply devices 1a and 1b with a level of charge equal to the 60% of the maximum value, and the supply group 110b with a level of charge equal to the 100% of the maximum value, the control unit 80 is arranged to connect the supply devices 1c and 1d, i.e. those of the supply group 110b to the electric vehicle 200, for example closing the switches 155c and 155d, associated respectively to the same, and to disconnect, instead, opening the switches 155a and 155b, the supply devices 1a and 1b.

The group of consistent supply devices, i.e. the group 110a comprising the supply devices 1a and 1b, continues preferably to supply the electric motor of vehicle 200 till the operation signal of the "KEY" indicates that the user is using the vehicle 200 (Key ON) without stopping the same. Only when the functioning signal of the key indicates that the user has turned off the vehicle 200 (key OFF) the control unit 80 consider again which group of consistent supply devices has the highest level of charge.

Figure 16:
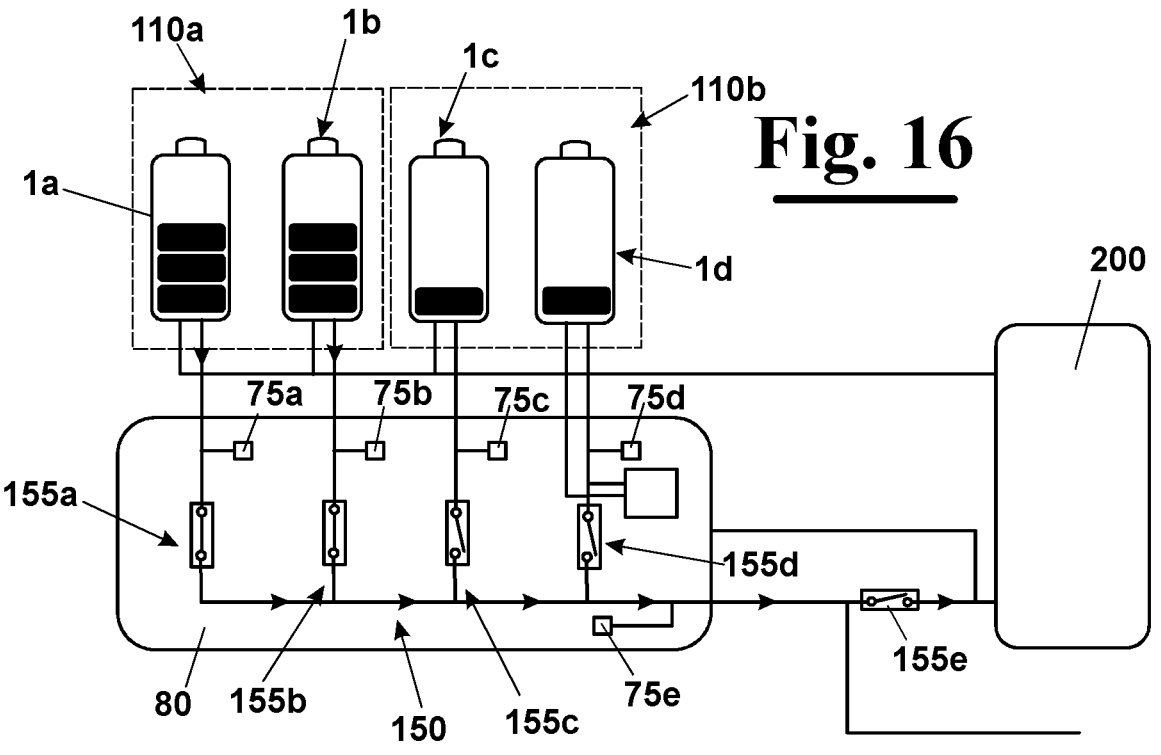

As diagrammatically shown in FIG. 16, when the level of charge, or SOC, of the supply group 110b, i.e. the one supplying the electric motor of the vehicle 200, reaches a determined minimum threshold value $SOC_{min}$, the supply system 1, advantageously, indicates the user the low level of charge, for example by a warning light, and/or an audio signal, in reply of which the user will turn off the vehicle 200 operating the key in the OFF position, to give the opportunity to the central control unit 80 to exclude the supply devices 1c and 1d with a low level of charge, i.e. those of the supply group 110b, for example equal to 10% of the maximum charge, and, instead, to connect to the electric vehicle 200 the supply devices 1a and 1b of the group 110a having a higher level of charge, about 60% of the maximum charge. In particular, the turning off of the vehicle to move from the supply group 110b to the supply group 110a has the purpose to avoid sudden changes of electric voltage. In fact, these sudden changes of electric voltage would be erroneously interpreted by the electric motor of the vehicle 200 as the will of the user to increase the speed, with possible dangerous consequences for the user.

According to an alternative embodiment of the invention, instead, the central control unit 80 can be configured to move from a supply group 110a, 110b to the other, in the case of figure from the supply group 110b to the supply group 110a, without the need to turn off the vehicle 200 by the user. In this case, is, advantageously, provided a dedicated circuit, not shown in figure for simplicity, through which the central control unit 80 is arranged to module the current before supplying electric power to the vehicle 200 to avoid the aforementioned sudden changes of electric power between the two operative modes.

Figures 17, 18:
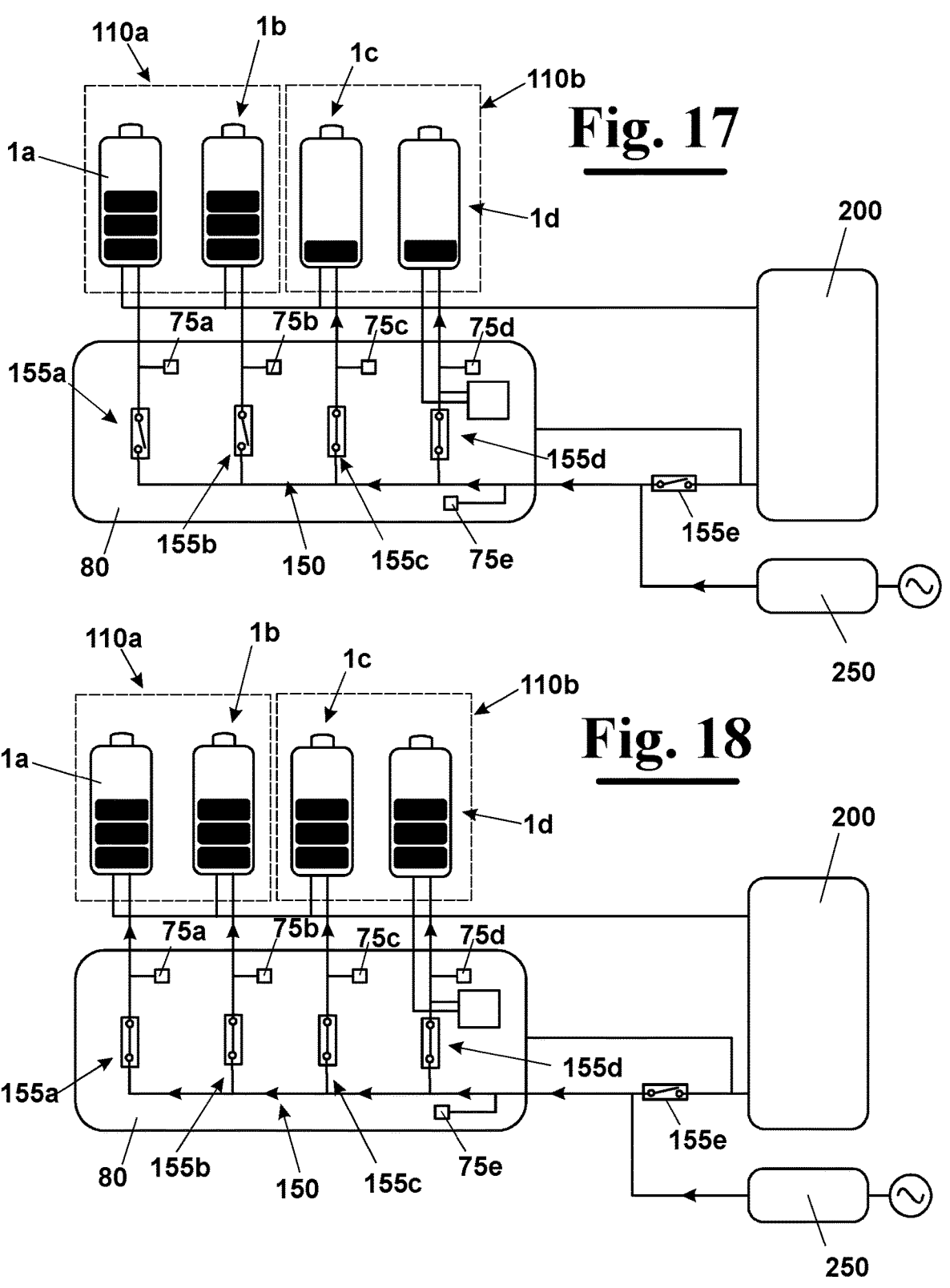
Figure 19:
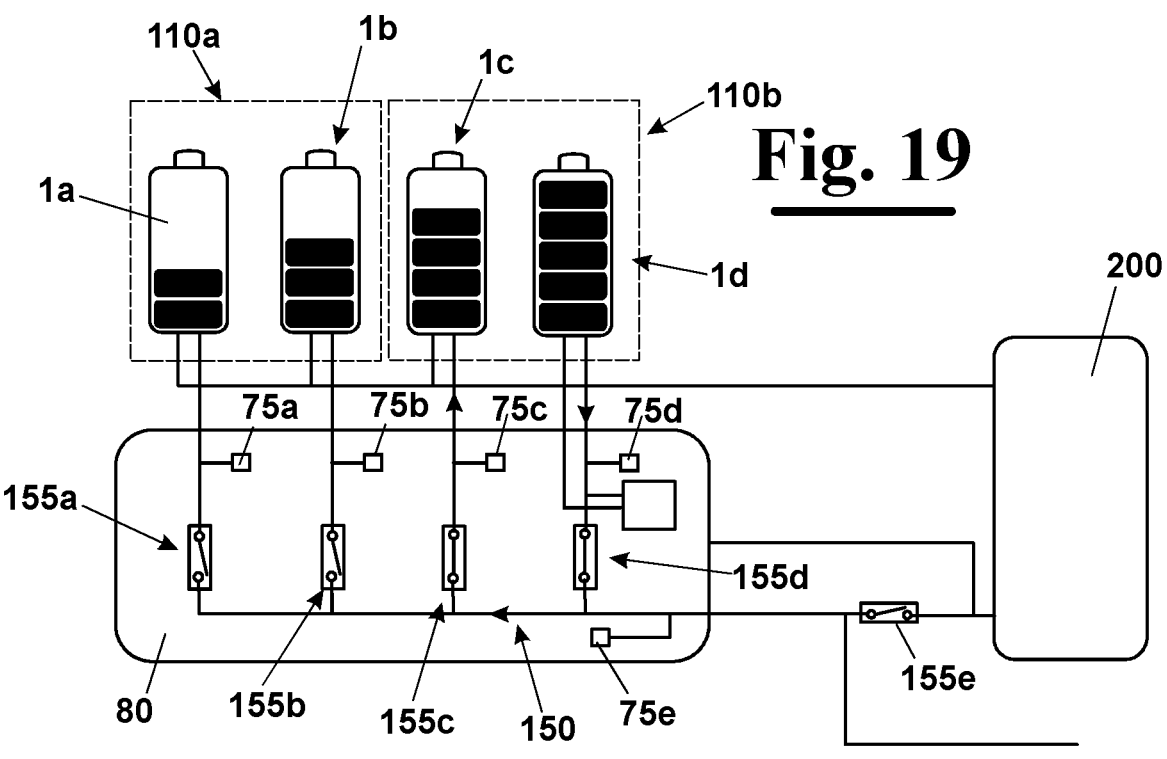

As diagrammatically shown in the FIGS. 17 and 18, during recharging of the supply devices 1a-1d, in particular by a recharge device 250, for example a recharge device 250 having a central body provided with a predetermined number of housings, not shown in the figure for simplicity, advantageously having a geometry similar to that of the housings 50 described above for the battery housing 40 and provided with third connectors similar to those of the second connectors 53, is possible to use the following recharge principle. In particular, once that the modular supply system 100 has been disconnected from the vehicle 200, for example by a main switch 155e, and connected to the same, or at least to a supply device 1 at a time, between those of which is provided with, the central control unit 80 can be arranged to charge at first the supply devices 1 with a lowest level of charge, or SOC, for example in the case of FIG. 17, the supply devices 1c and 1d of the supply group 110b. This can be carried out by the central control unit 80 analogously to what has been described in the case of electric power supplied by the system 100, i.e. closing, or opening, determined switches 155 between those that are present in the supply/absorption circuit 150.

Advantageously, once that the supply devices 1c and 1d in charge reach the same level of charge SOC of the supply devices with a higher level of charge, in FIG. 17 the supply devices 1a and 1b, the control unit 80 can be arranged to connect all the supply devices 1 to the recharge device 250 by closing all the switches 155a-155d, in such a way to obtain a charge that is substantially homogeneous for all the supply devices 1a-1d of the system 100.

According to still another operative mode provided by the modular supply system 100, when the vehicle 200 is not working, the system 1 is disconnected by the electric motor of the same, if no supply device 1a-1d is consistent with another, or, however, if the system 100 comprises at least 2 inconsistent supply devices 1, the central control unit 80 can be arranged to balance the inconsistent supply devices 1 electrically connecting one another the same by the aforementioned electric circuit 150. More in particular, in the case that all the supply devices 1a-1d have a different value of charge, the central control unit 80 is arranged to balance at first the two supply devices 1 having the highest charge, in the case of figure the supply devices 1c and 1d. Then, it is also possible to balance between the two supply devices with a lower level of charge, in FIG. 20 the supply devices 1a and 1b.

Figure 20:
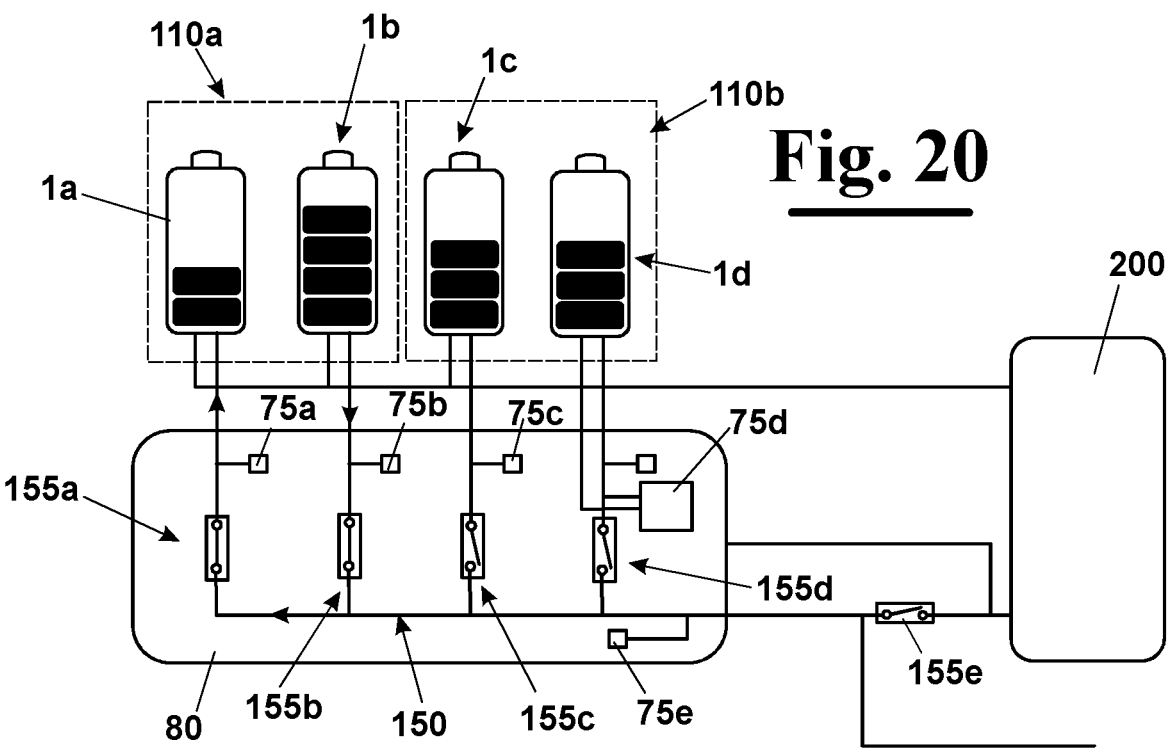

According to an alternative embodiment provided by the invention and diagrammatically shown in FIG. 20, instead, the central control unit 80 is arranged to balance the supply device 1 with the lowest level of charge, in FIG. 20 the supply device 1a, with the supply device 1 having the highest level of charge, in FIG. 20 the supply device 1b.

Figure 21:
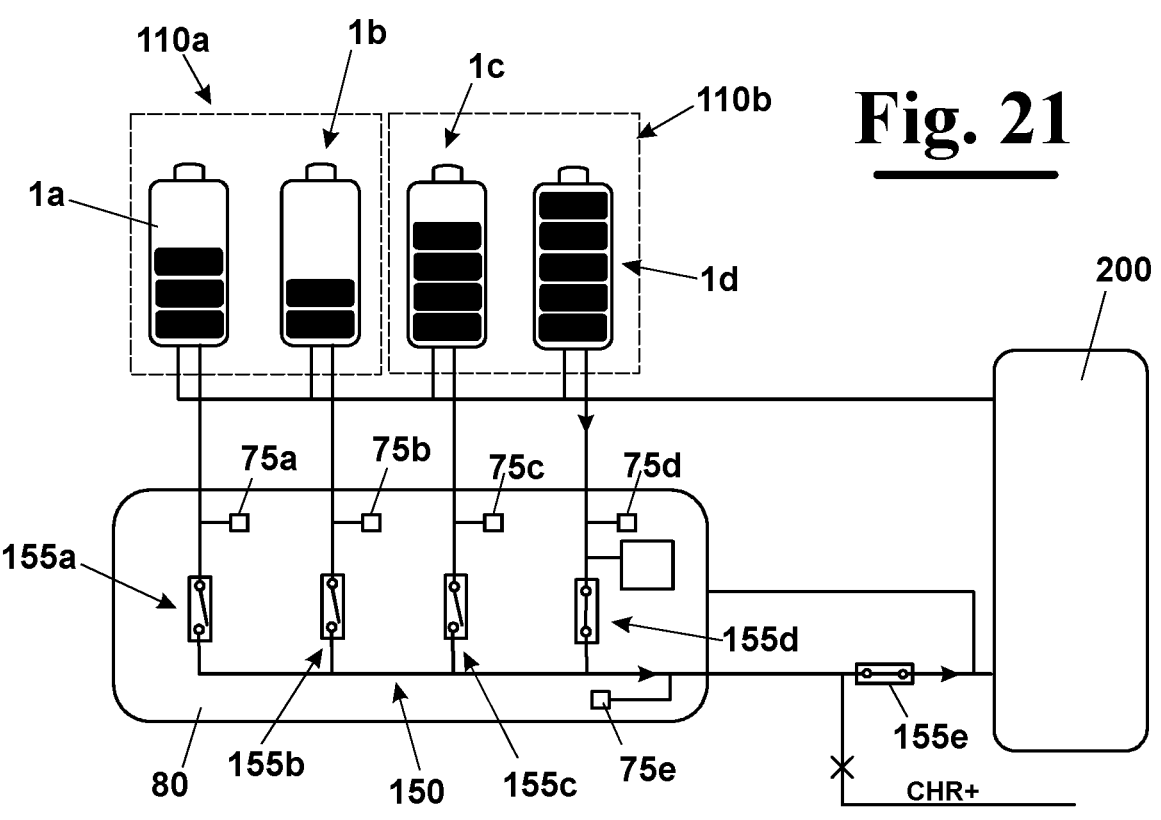
Figure 22:
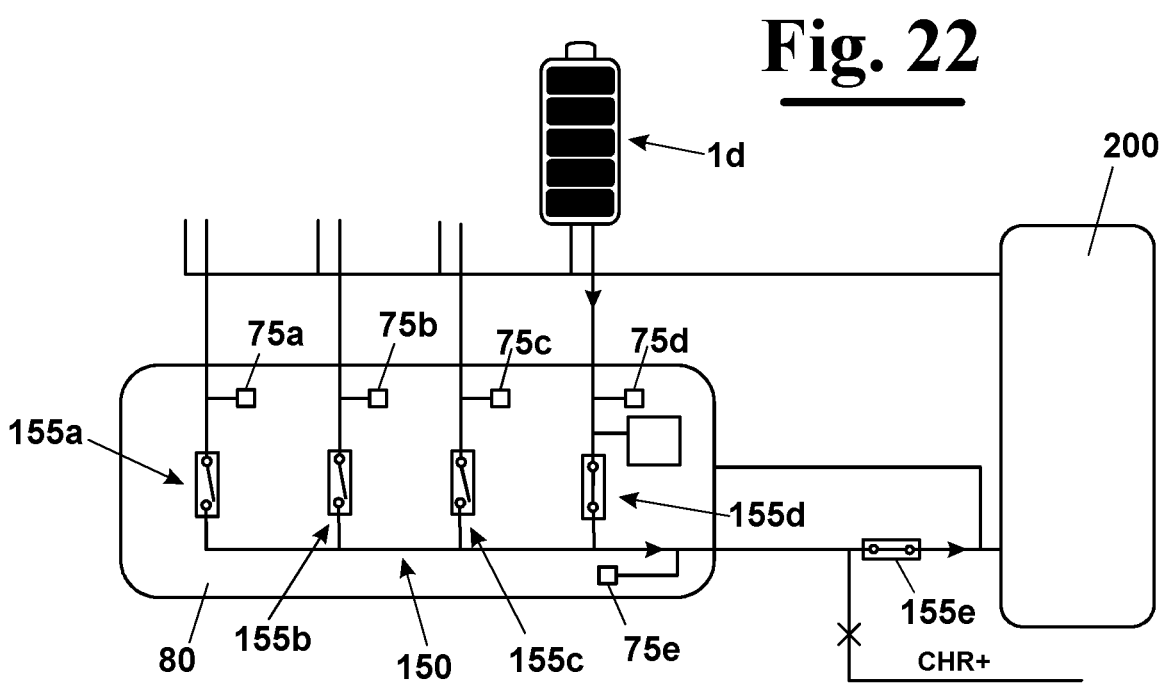

In FIG. 21 the case is, furthermore, diagrammatically shown in which with the electric motor of the vehicle 200 a turned on, no supply device 1a-1d is consistent with another one. In this case, the central control unit 80 is arranged to connect the vehicle 200 only to the supply device 1 with the highest level of charge, in FIG. 21 the supply device 1d. In this case, the maximum electric power that can be supplied to the vehicle 200 is less than the maximum electric power that the vehicle can request. This solution allows, anyway, to use the vehicle 200 even though with worse performances, in particular less acceleration, more difficulties to run steep slopes, than those that can be reached with a number N of devices. Analogously, if the system 100 is temporarily provided with only 1 supply device 1 available and housed within the respective housing seat 50, in FIG. 23 the supply device Id, the system 100 will anyway to supply electric power in such a way to assure the functioning of the vehicle 200 even though with worse performances with respect to the greatest performances.

According to another embodiment provided by the present invention, the modular supply system 100 can be arranged to start a balancing procedure similar to that described with reference to the FIGS. 20 and 21, but during the functioning of the vehicle 200 and not when the vehicle is stopped. In this case a power cable 60a is, advantageously, provided arranged to connect the different supply devices 1a-1d for their autonomous charge, or discharge.

Figure 23:
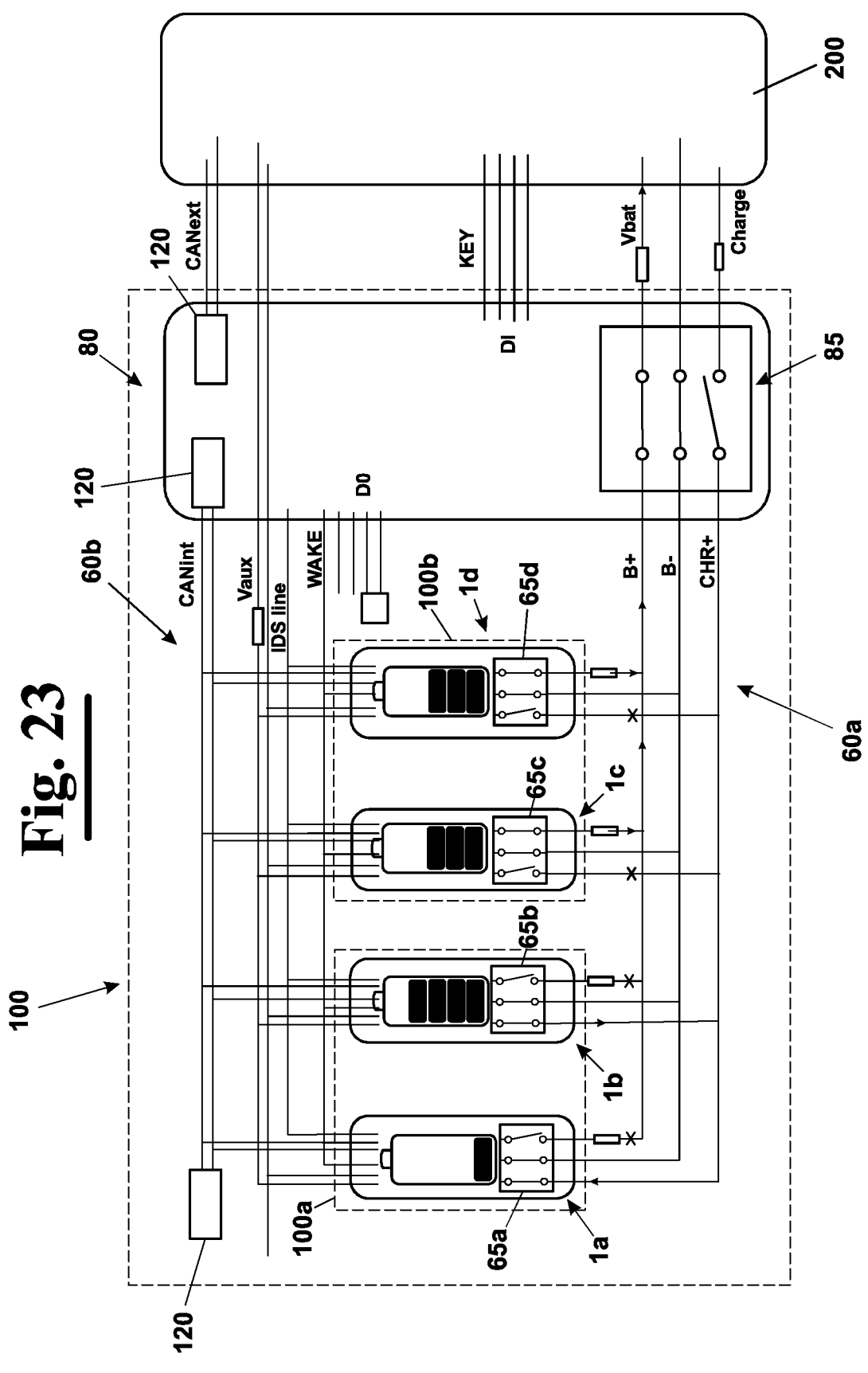

For example, a possible functioning scheme of a balancing step with the motor of the vehicle 200 turned on is shown in FIG. 23. In particular as diagrammatically shown in FIG. 23, in the case of a first supply group 110a and of a second of supply group 110b each of which arranged to autonomously supply the electric vehicle 200, for example a scooter, the control unit 70 can manage the supply circuit 150 to connect the group 110b comprising the consistent supply devices 1c and 1d to the electric motor of the vehicle 200, which, therefore, can go on to circulate, and start at the same time the balancing procedure between the supply devices 1a and 1b of the supply group 110a in such a way to bring them in a operative condition ready to supply electric power if necessary.

In the alternative embodiment of the modular supply system 100 that is diagrammatically shown in the figures from 27 to 32, the battery housing 40 is provided with at least an opposition member 45, for example 4 opposition members 45, arranged to elastically oppose the introduction of a supply device 1 within a respective housing seat 50 and the removal of the supply device 1 same from the respective housing seat 50. More in detail when the supply device 1 is positioned within the housing seat 50, the opposition member 45 is arranged to keep the same in a correct position avoiding that potholes, humps, or any other harshness of the street run by the vehicle 200 supplied by the system 100, can cause the supply device 1 to move from the correct working position and, therefore, to stop the supply of electric power. More precisely, as for example shown in the FIGS. 31 and 32, during the positioning of a supply device 1 within the respective housing seat 50 of the battery housing 40, is necessary to win the elastic force of opposition applied by the opposition member 45 in order to be able to introduce the supply device 1 within the respective housing seat 50, or remove the same, (FIG. 31 and FIG. 32, left side). Once that the supply device 1 has been completely introduced within the respective housing seat 50 as diagrammatically shown on the right side of FIG. 32, the opposition member 45 is arranged to be positioned in a blocking position. In particular, the opposition member 45 can comprise a first portion 45a and a second portion 45b able to move one with respect to the other, advantageously, at least one of which arranged to rotate with respect to the other about a rotation axis 145, to be positioned in the aforementioned blocking position. More in particular, between the first and the second portion 45a and 45b an elastic member 46 can be provided, for example a linear spring, or a torsion spring, configured to cause the first portion 45a and the second portion 45b, to depart from each other, for example by rotating about the rotation axis 145. More in detail, during the positioning of the supply device 1 into the housing seat 50 (left side of FIG. 32) the aforementioned departing movement of the portions 45a and 45b of the opposition member 45, is impeded by the constraining force applied by the lateral wall 11 of the tubular body 10 that overcomes the elastic force applied by the elastic member 46 and, therefore, impedes the first and the second portion 45a and 45b to move in the blocking position (see right side of FIG. 31). In particular, according to the invention, the handle portion 16 of the supply device 1 is engaged, for example hinged, at an engagement portion 16c. This is, advantageously, closer to the axis of the supply device 1 than the lateral wall 11, whereby between the lateral wall 11 and the engagement portion 16c a recess, or step 13' is formed. Therefore, when, the supply device 1 is completely housed within the respective housing seat 50 (see the condition shown at the right side of FIG. 32), the presence of step 13' between the lateral wall 11 of the tubular body 10 and the engagement portion 16c allows the portion 45b of the opposition member 45 to move forward towards the supply device 1 pushed by the elastic member 46 that is positioned in the blocking position (right side of FIG. 32). Advantageously, in order to assure that the opposition member 45 does not move from the blocking position, the handle portion 16 can be provided with a blocking portion 16a. In particular, the blocking portion 16a can be configured in such a way that, when the handle portion 16 is arranged in the rest position (right side of FIG. 32) is arranged to apply a blocking force to the first portion 45a, preferably a shaped wall, of the opposition member 45 adjacent to it. More precisely, the two walls that in the blocking position are arranged adjacent to each other, are inclined at a predetermined angle. When the supply device 1 has to be removed from the housing seat 50, the rotation of the handle portion 16 about the rotation axis 116 causes a push of the aforementioned blocking portion 16a on the opposition member 45 which allows to overcome the elastic force applied by the elastic member 46 and therefore to remove the supply device 1 from the housing seat 50.

In particular, as for example shown in the figures from 27 to 29, the spatial orientation of the different supply devices 1 with respect to the battery housing 40 can be different, or the same, as instead diagrammatically shown in the figures from 9A to 9E.

In addition, or alternatively, to the opposition member 45 described above with reference to the FIGS. 31 and 32, according to an embodiment of the invention diagrammatically shown in FIG. 33, each housing seat 50 of the battery housing 40, preferably near a base 54 of the same, i.e. the zone where the first connector 55 is positioned, can be provided with a supplementary opposition member 67 configured to slacken the fall of the supply device 1 towards the base 54. In other words the supplementary opposition member 67 is arranged to elastically oppose the positioning of the end wall 14 of the supply device 1 adjacent to the base 54 of the housing seat 50. More precisely, the supplementary opposition member 67 can comprise a plate associated to an elastic member 68, for example a linear spring, arranged to apply an elastic force which opposes the aforementioned positioning. In this way, it is assured that the supply device 1, during its positioning within the housing seat 50 is slowly positioned on the base 54 of the housing seat 50, avoiding that the supply device 1 can accidentally "precipitate" on the base 54 and, therefore, damage the connectors 55 and 65 which could be, otherwise, pressed by the supply device 1 and bent compromising the mutual correct engagement. In other words, therefore, the supplementary opposition member 67 can be seen as a dumper that is able to "slacken" the last step of the positioning of the supply device 1 within the housing seat 50.

According to a further alternative embodiment of the invention, diagrammatically shown in the figures from 34 to 45, the battery pack 20 can comprise a plurality of layers of cells 25 superimposed to each other, for example at least 2 superimposed layers of cells 21a and 21b. In particular, at least between two superimposed layers 21a and 21b of cells 25, each of which for example comprising 3 cells 25 (FIGS. 34 and 35), can be positioned an interposition member 90 comprising an electrical connection member 95. This is, advantageously, made of an electrical conductive material and is provided with a plurality of contacting portions 91, more in particular of a first and of a second plurality of contacting portions 91a and 91b. These are, advantageously, configured to protrude from opposite faces 90a and 90b of the interposition member 90. Preferably, the contacting portions 91a and 91b of each plurality are positioned in respective axial symmetric positions with respect to an axis of symmetry 190. More precisely, at each contacting portion 91a of the first plurality is positioned adjacent, in use, a respective cell 25 of the first layer of cells 21a, and, at each contacting portion 91b of the other side is positioned adjacent a cell 25 of a second layer of cells 21b. More in particular, the electrical connection member 95 can be positioned between the positive pole of a cell 25 and the negative pole of another cell, or between the positive pole of a group of 3 cells 25 arranged in parallel with each other and the negative pole of a group of 3 cells arranged in parallel with each other. For example, the interposition member 90 can have a substantially triangular, or square geometry. In particular, the interposition member 90 can be provided with 3 contacting portions 91a arranged at 120° one with respect to the other at a first side and of 3 contacting portions 91b also these arranged at 120° at the second side. According to an alternative embodiment of the inventio, the interposition member 90 can provide 4 contacting portions 91a at the first side and 4 contacting portions 91b arranged at 90° at the second side.

In particular, the electrical connection member 95 can be provided with a plurality of protruding portions, preferably with curved profile, at each of which a respective contacting portion 91 is provided, in the case of FIGS. 34-45, 3 protruding portions 91a and 91b. Advantageously, the electrical connection member 95 is made of a material having a high electrical conductivity, in particular a metallic material. According to a preferred embodiment, the electrical connection member 95 is made of nickel copper, or nickel plated copper material, that is able to assure a high electrical conductivity. As diagrammatically shown, for example, in the FIGS. 40 and 41, the electrical connection member 95 can comprise a first plate portion 92a and a second plate portion 92b arranged, in use, on substantially parallel planes and provided with a respective plurality of contacting portions 91a and 91b, for example provided respectively with 3 contacting portions 91a and 91b. More in detail, each contacting portion 91a of the first plate portion 92a is, advantageously, superimposed, i.e. aligned, with a respective contacting portion 91b of the second plate portion 92b. More in detail, the first and the second plate portion 92a and 92b are mutually engaged to each other by a connection portion 92c, preferably peripherally arranged, configured in such a way that the first plate portion 92a and the second plate portion 92b can elastically approach, or depart one with respect to the other. In particular, the connection member 95 can be a plate having a thickness comprised between 0.1 mm and 0.6 mm, advantageously comprised between 0.2 mm and 0.4 mm, for example produced by metallic material forming and, then, bent in a "U" shape.

In particular, the first plate portion 92a and the second plate portion 92b have respective free end portions 97a and 97b.

Advantageously, between the first and the second plate portion 92a and 92b at the superimposed contacting portions 91a and 91b at least an elastic member 94 can be provided, that is preferably made of an elastomeric material, for example EPDM (Ethylene-Propylene Diene Monomer), or silicone (see FIG. 43B).

In particular, the first and the second plate portion 92a and 92b are mutually engaged to each other by welding at least at a welded portion 96, advantageously arranged along the axis of symmetry 190 (see FIG. 43A). Therefore, the electrical connection member 95 is arranged to allow the electric current to move between the first plate portion 92a and the second plate portion 92b only at the, or each, welded portion 96. As diagrammatically shown in FIG. 44, if the connection member 90 is provided with 3 contacting portions 91a at the first plate portion 92a and with respective 3 contacting portions 91b at the second plate portion 92b, from the cells 25 positioned adjacent to the contacting portions 91a of the first plate portion 92a, the current moves from each contacting portion 91a towards the connection portion 96 and from this through the welded portion is distributed on the second plate portion 92b where it reaches the 3 contacting portions 91b. This because the elastic member 94 is made of an electrical insulating material and, therefore, does not allow the current to move from the contacting portion 91a of the first plate portion 92a to the respective contacting portion 91b of the second contacting portion 92b.

Advantageously, the interposition member 90 can comprise, furthermore, a spacer member 93 provided with an aperture 98 passed through, in use, by the electrical connection member 95. More precisely, between the internal wall of the aperture 98 and the external wall of the electrical connection member 95 there is no interference in such a way that the first and the second plate portion 92a and 92b, in use, are able to elastically move one with respect to the other.

Advantageously, the spacer member 93, preferably made of plastic material, at one of its faces, can be provided with a shaped groove 97 configured to house, in use, at least a connection cable 60 of the aforementioned plurality, in particular the balance cables of the cells 25.

In particular, the technical solution provided by the embodiment described above with reference to the figures from 34 to 45 with respect to the prior art solutions allows to avoid welding of the connection cables 60a, 60b, and 60c, in particular of the balance cables, in order to assure the transfer of the current between a layer and another. Therefore, the assembly and the disassembly of the supply device 1 are highly simplified. In addition to the above, the embodiment of the invention that is diagrammatically shown in the figures from 34 to 45 allows to carry out an optimal balancing step of the current. In particular, the necessary conditions of balance of the transit of the current are assured, in first place, by the geometry of the system, in particular the axial symmetry provided for the positions of the contacting portions 91*a* and 91*b*. In fact, the aforementioned axial symmetry allows to have symmetrical transit of the current between the 3, or more, cells positioned on the same side of the interposition member 90 and the 3, or more cells, positioned on the other side because the current passes through each plate portion 92*a* and 92*b* along predefined and known zones of the electrical connection member 95 and precisely from the contacting portions 91*a* towards the welding zone 96 and from this towards the contacting portions 91*b*. In addition to the above, the members 94 made of elastic material guarantees to have a known and constant pressure, because linked to the elastic constant of the elastic material that is used, between the electrical connection member 95 and poles of the cells adjacent to it at the contacting portions 91*a* and 91*b*. Since the compression of the elastic member is known the contact pressure is obtained and guaranteed applying an approaching force of one cell 25 with respect to the other by pressing the elastic member same till an abutment surface obtained at a calibrated plastic thickness, i.e. the thickness of the spacer member 93. Furthermore, the members 94 made of elastic material assure to have all the electrodes of the cells always in contact with the electrical connection member 95. In this way, on the one hand an insufficient surface area for the current in transit is avoided, this condition would cause to have peaks of temperature locally that would damage the electrical parts of the system, and on the other hand, a loss of balance in the transit of the current through the system owing to the different surfaces that would have for the different cells and that would lead to have preferential paths for the transit of the current between the cells of the same group that would cause a differentiated discharge for the different cells.

In FIG. 45 a possible layout of a supply device 1 is diagrammatically shown adopting the 5 interposition members 90 as described above with reference to the figures from 34 to 44 and precisely 4 interposition members 90 of which the dimensions of the respective conductive members 95, provided respectively with 3 connection portions 91 at 120° at each side are diagrammatically indicated with a broken line, and an interposition member 90' of which the dimensions of the respective conductive member 95' provided with 2 connection portions 91 on each side, are diagrammatically indicated.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to carry out the different functions described herein could have a different nature without, for this reason, departing from the field of the invention. It is to be understood that the phraseology or terminology employed herein is for the purpose of description and not of limitation.

The invention claimed is:

1. A supply device comprising:
   a tubular body configured to contain a battery pack formed by a plurality of cells organized in a predetermined number of superimposed layers;
   a control unit configured to monitor a state of functioning and to manage a charge of said battery pack;
   a connector including a plurality of electrical contacts to supply, or absorb, a predetermined electric power; and
   a plurality of connection cables arranged to connect said battery pack to said plurality of electrical contacts of said connector and to said control unit;
   wherein:
      each layer of cells includes a first group of cells and a second group of cells;
      between said first group of cells and said second group of cells a housing channel is formed delimited by a first lateral containment wall and a second lateral containment wall for housing, in use, said plurality of connection cables;
      said battery pack comprises a plurality of superimposed layers of cells;
      between two consecutive superimposed layers of cells an interposition member is provided comprising an electrical connection member provided with a first plurality of contacting portions at a first side and a second plurality of contacting portions at a second side at respective axial symmetric positions with respect to an axis of symmetry,
      a cell of a first layer of the superimposed layers is positioned, in use, adjacent to a respective contacting portion of said first plurality of contacting portions,
      a cell of a second layer of the superimposed layers is positioned, in use, adjacent to a respective contacting portion of said second plurality of contacting portions;
      said electrical connection member is provided with a plurality of protruding portions at the first side and at the second side at which said first plurality of contacting portions and said second plurality of contact portions are provided, respectively;
      said electrical connection member is made of a metallic material;
      said electrical connection member comprises a first plate portion and a second plate portion arranged on substantially parallel planes and provided respectively with the first plurality of contacting portions and the second plurality of contacting portions aligned with each other, and
      said first plate portion and said second plate portion are connected to each other by a connection portion configured in such a way to allow said first plate portion and second plate portion to elastically approach, or depart, with respect to one another.

2. The supply device according to claim 1, wherein said first lateral containment wall and said second lateral containment wall are configured to move with respect to one another between:
   a spaced position, where it is possible to position said connection cables within said housing channel, or remove them, and
   a close position, where said first lateral containment wall and said second lateral containment wall are arranged to arrange said battery pack in a configuration of minimum lateral encumbrance, with said connection cables positioned within said housing channel.

3. The supply device according to claim 1, wherein said first lateral containment wall and said second lateral containment wall are provided with:

a first surface facing towards said housing channel and arranged to laterally contain said plurality of connection cables, and a second surface opposite to said first surface provided with a plurality of longitudinal grooves configured to house, in use, a respective cell of said first group and of said second group, respectively.

4. The supply device according to claim 1, wherein:

said tubular body is provided with a lateral surface having a substantially prismatic shape; and a first end wall and a second end wall are provided, which are arranged at opposite sides with respect to said tubular body, said second end wall being provided with said connector.

5. The supply device according to claim 4, wherein said first end wall is provided with a handle portion configured to move between:

a rest position, which is arranged to form a perimeter edge of said first end wall, and a grasping position, where said handle portion is inclined with respect to said first end wall.

6. The supply device according to claim 1, wherein:

said predetermined number of superimposed layers of cells includes a first layer of cells, a second layer of cells, and a third layer of cells, wherein the cells of the first layer of cells are connected in series, wherein the cells of the second layer of cells are connected in series, and the cells of the third layer of cells are connected in series, and wherein said first layer of cells, said second layer of cells, and said third layer of cells are connected in parallel.

7. The supply device according to claim 1, wherein said first lateral containment wall and said second lateral containment wall are configured to protrude longitudinally to said tubular body for a whole length of said battery pack.

8. The supply device according to claim 1, wherein an elastic member is provided between said first plate portion and said second plate portion at said first plurality of contacting portions and at said second plurality of contacting portions.

9. The supply device according to claim 8, wherein the elastic member is made of an elastomeric material.

10. The supply device according to claim 8 wherein said first plate portion and second plate portion are mutually engaged to each other by welding at a welded portion arranged along said axis of symmetry, said electrical connection member being arranged to allow the movement of electric current between said first plate portion and said second plate portion only at the welded portion.

11. The supply device according to claim 1, wherein said interposition member further includes, a spacer member provided with an aperture arranged to house, in use, said electrical connection member in such a way that said first plate portion and second plate portion are able to move towards one another.

12. The supply device according to claim 1, wherein said first plate portion and second plate portion provide respective free end portions.

13. The supply device according to claim 11, wherein said spacer member is provided with a shaped groove configured to house, in use, a connection cable of said plurality of connection cables.

14. A modular supply system to supply an electric, or hybrid, vehicle, comprising:

a battery housing including a plurality of housing seats having a substantially prismatic shape, each housing seat being provided with a first connector comprising a respective plurality of electrical contacts;

a plurality of supply devices provided with tubular bodies having a substantially prismatic shape and configured to contain a respective battery pack formed by a plurality of cells organized in a predetermined number of superimposed layers, each supply device of said plurality:

being arranged to move from a position external to said battery housing, to an internal position, which is arranged to engage into a respective housing seat of said battery housing;

being provided with a second connector including a plurality of electrical contacts and arranged to be connected to said first connector including said respective plurality of electrical contacts when said supply device is positioned in said internal position, to supply a predetermined electric power, and being provided with a respective control unit configured to monitor a state of functioning and to manage a charge of the respective battery pack; and a central control unit configured to monitor the state of functioning and to manage the charge of the different supply devices;

wherein:

each layer of cells includes a first group of cells and a second group of cells;

between said first group of cells and said second group of cells a housing channel is formed arranged to contain, in use, a plurality of connection cables arranged to connect said battery pack with said second connector and, therefore, to said first connector;

said housing channel is delimited by a first lateral containment wall and a second lateral containment wall in such a way to separate said plurality of cells from said housing channel;

said battery pack comprises a plurality of superimposed layers of cells;

between two consecutive layers of said plurality of superimposed layers an interposition member is provided including an electrical connection member provided with a first plurality of contacting portions at a first side and a second plurality of contacting portions at a second side at respective axial symmetric positions with respect to an axis of symmetry, a cell of a first layer of the superimposed layers is positioned, in use, adjacent to a respective contacting portion of said first plurality of contacting portions, a cell of a second layer of the superimposed layers is positioned, in use, adjacent to a respective contacting portion of said second plurality of contacting portions;

said electrical connection member is provided with a plurality of protruding portions at the first side and at the second side at which said first plurality of contacting portions and said second plurality of contacting portions are provided, respectively;

said electrical connection member is made of a metallic material;

said electrical connection member comprises a first plate portion and a second plate portion arranged on substantially parallel planes and provided respectively with the first plurality of contacting portions and the second plurality of contacting portions aligned with each other, and said first plate portion and said second plate portion are connected to each other by a connection portion configured in such a way to allow said first plate portion and second plate portion to elastically approach, or depart, with respect to one another.

15. The modular supply system according to claim 14, wherein said supply devices and said housing seats are configured to carry out a shape coupling, said tubular bodies of said supply devices and said housing seats of said battery housing being provided with respective lateral surfaces including a first converging side and a second converging side, in such a way to facilitate a movement from said external position to said internal position and vice versa.

\* \* \* \* \*